(12) United States Patent
Takahashi et al.

(10) Patent No.: US 11,748,442 B2
(45) Date of Patent: Sep. 5, 2023

(54) IMAGE MATCHING DEVICE

(71) Applicant: NEC Corporation, Tokyo (JP)

(72) Inventors: Toru Takahashi, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 486 days.

(21) Appl. No.: 17/049,460

(22) PCT Filed: Apr. 24, 2018

(86) PCT No.: PCT/JP2018/016597
§ 371 (c)(1),
(2) Date: Oct. 21, 2020

(87) PCT Pub. No.: WO2019/207642
PCT Pub. Date: Oct. 31, 2019

(65) Prior Publication Data
US 2021/0256254 A1 Aug. 19, 2021

(51) Int. Cl.
*G06K 9/00* (2022.01)
*G06F 17/14* (2006.01)
*G06F 17/15* (2006.01)
*G06F 18/22* (2023.01)
*G06V 10/42* (2022.01)
*G06V 10/75* (2022.01)

(52) U.S. Cl.
CPC .......... *G06F 17/141* (2013.01); *G06F 17/156* (2013.01); *G06F 18/22* (2023.01); *G06V 10/431* (2022.01); *G06V 10/75* (2022.01); *G06F 2218/14* (2023.01)

(58) Field of Classification Search
None
See application file for complete search history.

(56) References Cited

U.S. PATENT DOCUMENTS

2011/0188705 A1 8/2011 Tabaru
2021/0012167 A1* 1/2021 Takahashi .......... G06V 30/1985

FOREIGN PATENT DOCUMENTS

JP 3254622 B2 2/2002
JP 2005-316758 A 11/2005
(Continued)

OTHER PUBLICATIONS

International Search Report for PCT Application No. PCT/JP2018/016597, dated Jul. 17, 2018.
(Continued)

*Primary Examiner* — Soo Jin Park
(74) *Attorney, Agent, or Firm* — Sughrue Mion, PLLC

(57) ABSTRACT

An image matching device includes a weight determination unit and a matching unit. Based on a synthesized frequency characteristic obtained by synthesizing a frequency characteristic of a first image with a frequency characteristic of a second image and an ideal synthesized frequency characteristic that is an ideal one obtained by synthesizing the frequency characteristic of the first image with the frequency characteristic of the second image, the weight determination unit determines a weight relating to frequency in performing matching of the first image and a third image. The matching unit performs matching of the first image and the third image based on the determined weight.

15 Claims, 31 Drawing Sheets

(56) References Cited

FOREIGN PATENT DOCUMENTS

| JP | 2008-015848 | A | 1/2008 |
|---|---|---|---|
| JP | 2011-159156 | A | 8/2011 |
| JP | 5331721 | B2 | 10/2013 |
| JP | 2015-021824 | A | 2/2015 |

OTHER PUBLICATIONS

Toru Takahashi, Kengo Makino, Yuta Kudo, Rui Ishiyama, "A Study of Fast Image Matching Method Under Translation, Scale, and Rotation", IEICE Technical Report, BioX2017-42, PRMU2017-178, Mar. 2018, pp. 37-42, Japan.

\* cited by examiner

FIG. 8

$$F(k_1,k_2) = \sum_{n_1,n_2} f(n_1,n_2) W_{N_1}^{k_1 n_1} W_{N_2}^{k_2 n_2}$$
$$= A_F(k_1,k_2) e^{j\theta_F(k_1,k_2)} \quad \cdots (1)$$

$$G(k_1,k_2) = \sum_{n_1,n_2} g(n_1,n_2) W_{N_1}^{k_1 n_1} W_{N_2}^{k_2 n_2}$$
$$= A_G(k_1,k_2) e^{j\theta_G(k_1,k_2)} \quad \cdots (2)$$

$$W_{N_1} = e^{-j\frac{2\pi}{N_1}} \quad \cdots (3)$$

$$W_{N_2} = e^{-j\frac{2\pi}{N_2}} \quad \cdots (4)$$

$$\sum_{n_1,n_2} = \sum_{n_1=-M_1}^{M_1} \sum_{n_2=-M_2}^{M_2} \quad \cdots (5)$$

FIG. 9

$$\hat{R}(k_1,k_2) = \frac{F(k_1,k_2)\overline{G(k_1,k_2)}}{|F(k_1,k_2)\overline{G(k_1,k_2)}|}$$

$$= e^{j(\theta_F(k_1,k_2) - \theta_G(k_1,k_2))} \quad \cdots\cdots (6)$$

FIG. 10

$$F(k_1,k_2) = A_F(k_1,k_2)e^{j\theta_F(k_1,k_2)} \quad \cdots\cdots (7)$$

$$G(k_1,k_2) = A_G(k_1,k_2)e^{j\theta_G(k_1,k_2)}$$
$$\cong F(k_1,k_2)e^{-j\frac{2\pi}{N_1}k_1\delta_1}e^{-j\frac{2\pi}{N_2}k_2\delta_2} \quad \cdots (8)$$

$$\hat{R}(k_1,k_2) = \frac{F(k_1,k_2)\overline{G(k_1,k_2)}}{|F(k_1,k_2)\overline{G(k_1,k_2)}|}$$
$$\cong e^{j\frac{2\pi}{N_1}k_1\delta_1}e^{-j\frac{2\pi}{N_2}k_2\delta_2} \quad \cdots\cdots (9)$$

FIG. 14

$$\hat{r}(n_1,n_2) = \frac{1}{N_1 N_2} \sum_{k_1=-M_1}^{M_1} \sum_{k_2=-M_2}^{M_2} \hat{R}(k_1,k_2) W_{N_1}^{-k_1 n_1} W_{N_2}^{-k_2 n_2}$$

$$\simeq \frac{1}{N_1 N_2} \frac{\sin\{\pi(n_1+\delta_1)\}}{\sin\{\frac{\pi}{N_1}(n_1+\delta_1)\}} \frac{\sin\{\pi(n_2+\delta_2)\}}{\sin\{\frac{\pi}{N_2}(n_2+\delta_2)\}} \quad \cdots (10)$$

FIG. 19

NORMALIZED CROSS POWER SPECTRUM REAL PART: $\text{Re}\{e^{j\{\theta_F(k_1,k_2)-\theta_G(k_1,k_2)\}}\}$ NORMALIZED CROSS POWER SPECTRUM IMAGINARY PART: $\text{Im}\{e^{j\{\theta_F(k_1,k_2)-\theta_G(k_1,k_2)\}}\}$

PHASE ANGLE:

$$\angle \hat{R}(k_1,k_2) = \arctan\left(\frac{\text{Im}\{e^{j\{\theta_F(k_1,k_2)-\theta_G(k_1,k_2)\}}\}}{\text{Re}\{e^{j\{\theta_F(k_1,k_2)-\theta_G(k_1,k_2)\}}\}}\right)$$

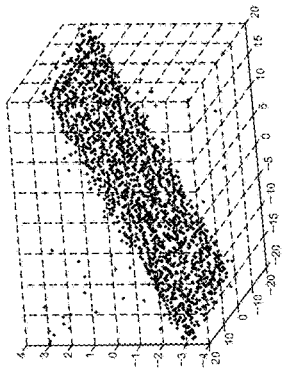

IN CASE OF COMPLEX SINE WAVE WITH SINGLE PERIOD, PHASE ANGLES LINE UP ON THE PLANE

⇧ APPLY APPROXIMATE PLANE AND CALCULATE SLOPE

⇧ ESTIMATE COMPLEX SINE WAVE FROM EQUATION 9

$\delta_1, \delta_2$ OF EQUATION 9 : SLOPE OF PHASE ANGLE

FIG. 22

CROSS POWER SPECTRUM (PAIR OF IDENTICAL IMAGES)

$$\hat{R}(k_1, k_2) \cong e^{j\frac{2\pi}{N_1}k_1\delta_1} e^{j\frac{2\pi}{N_2}k_2\delta_2}$$

DIFFERENTIATE WITH $k_1, k_2$ (GRADIENT CALCULATION)

$$\left( \frac{\partial}{\partial k_1} e^{j\frac{2\pi}{N_1}k_1\delta_1} e^{j\frac{2\pi}{N_2}k_2\delta_2}, \frac{\partial}{\partial k_2} e^{j\frac{2\pi}{N_1}k_1\delta_1} e^{j\frac{2\pi}{N_2}k_2\delta_2} \right) = \left( j\frac{2\pi\delta_1}{N_1} e^{j\frac{2\pi}{N_1}k_1\delta_1} e^{j\frac{2\pi}{N_2}k_2\delta_2}, j\frac{2\pi\delta_2}{N_2} e^{j\frac{2\pi}{N_1}k_1\delta_1} e^{j\frac{2\pi}{N_2}k_2\delta_2} \right)$$

TAKE ABSOLUTE VALUE OF EACH ELEMENT $$\left( \left| j\frac{2\pi\delta_1}{N_1} e^{j\frac{2\pi}{N_1}k_1\delta_1} e^{j\frac{2\pi}{N_2}k_2\delta_2} \right|, \left| j\frac{2\pi\delta_2}{N_2} e^{j\frac{2\pi}{N_1}k_1\delta_1} e^{j\frac{2\pi}{N_2}k_2\delta_2} \right| \right) = \left( \frac{2\pi\delta_1}{N_1}, \frac{2\pi\delta_2}{N_2} \right)$$

CONSTANT VALUE REGARDLESS OF $k_1, k_2$ (DISCRETE FREQUENCY INDEX)

EXTRACT REGION OF CONSTANT VALUE, CALCULATE $\delta_1, \delta_2$ FROM VALUE AT THAT TIME, AND ESTIMATE COMPLEX SINE WAVE

FIG. 23

$W(k_1, k_2) = 1 - |R_{diff}(k_1, k_2)|$  ⋯ (11)

$W(k_1, k_2)$ : WEIGHT $R_{diff}(k_1, k_2)$ : OUTPUT FROM DIFFERENCE CALCULATION UNIT
 (DIFFERENCE BETWEEN NORMALIZED CROSS POWER SPECTRUM
  AND IDEAL NORMALIZED CROSS POWER SPECTRUM)

FIG. 25

$W(k_1, k_2) = |R_{diff}(k_1, k_2)|$ $\cdots$ (12)

$W(k_1, k_2)$ : WEIGHT $R_{diff}(k_1, k_2)$ : OUTPUT BY DIFFERENCE CALCULATION UNIT
(DIFFERENCE BETWEEN NORMALIZED CROSS POWER
SPECTRUM AND IDEAL NORMALIZED CROSS POWER SPECTRUM)

FIG. 26

$W(k_1, k_2) = (1+i) - R_{diff}(k_1, k_2)$ · · · (13)

$W(k_1, k_2)$ : WEIGHT $R_{diff}(k_1, k_2)$ : OUTPUT BY DIFFERENCE CALCULATION UNIT
(DIFFERENCE BETWEEN NORMALIZED CROSS POWER
SPECTRUM AND IDEAL NORMALIZED CROSS POWER SPECTRUM)

FIG. 27

$W(k_1, k_2) = R_{diff}(k_1, k_2)$ · · · (14)

$W(k_1, k_2)$ : WEIGHT $R_{diff}(k_1, k_2)$ : OUTPUT BY DIFFERENCE CALCULATION UNIT
(DIFFERENCE BETWEEN NORMALIZED CROSS POWER
SPECTRUM AND IDEAL NORMALIZED CROSS POWER SPECTRUM)

IMAGE MATCHING DEVICE

This application is a National Stage Entry of PCT/JP2018/016597 filed on Apr. 24, 2018, the contents of all of which are incorporated herein by reference, in their entirety.

TECHNICAL FIELD

The present invention relates to an image matching device, an image matching method, and a program.

BACKGROUND ART

Various image matching methods for performing matching of a compared image and a registered image for the purpose of individual identification and so on have been proposed.

For example, in Patent Document 1, first, a compared image and a registered image are transformed into the frequency domain by applying the Fourier transformation. Next, a cross power spectrum is calculated from the respective complex spectrums of the compared image and the registered image obtained in the above transformation. Next, the cross power spectrum is normalized to phase components alone by eliminating power components using a weight filter for each frequency. Next, by applying the inverse Fourier transforming to the normalized cross power spectrum, a correlation coefficient on the real coordinate domain is calculated. Next, pattern matching determination is performed by using coordinates with the calculated correlation coefficient becoming the maximum value.

Further, in Patent Document 2, a registered Fourier image is generated in advance by applying the Fourier transformation to a registered image. Next, a compared Fourier image is generated by applying the Fourier transformation to a compared image. Next, the compared Fourier image and the registered Fourier image generated in advance are synthesized. After performing the amplitude suppression processing on the synthesized Fourier image, the inverse Fourier transformation is applied. Next, the upper n pixels having higher correlation components than in a predetermined correlation component area appearing in the synthetized Fourier image with the inverse Fourier transformation applied are extracted. Then, based on the intensity of the correlation components of the extracted n pixels, it is determined whether or not the registered image and the compared image match.

Further, in Non-Patent Document 1, by obtaining a normalized cross power spectrum that is a synthesized frequency characteristic obtained by synthesizing the frequency characteristic of a registered image and the frequency characteristic of a compared image, and determining the distribution shape in the frequency domain, matching of the compared image and the registered image is performed. Non-Patent Document 1 focuses on that in the case of a pair of identical images with a positional shift, a normalized cross power spectrum of the frequency characteristics of these two images is a complex sine wave having a single period with respect to a discrete frequency index. Then, in Non-Patent Document 1, a matching score representing the degree of similarity between the registered image and the compared image is calculated by calculation of partial differential of the normalized cross power spectrum, calculation of the absolute values of the respective elements with respect to the obtained result of the differential, and calculation of the variance of the obtained absolute values.

Meanwhile, the following is known as another technique relating to the present invention.

In Patent Document 3, based on a registered image that includes a specific image pattern and a fixed pattern noise, and a plain image that includes the fixed pattern noise but does not include the specific image pattern, the frequency components of the fixed pattern noise unique to the image capturing device which are commonly included by the registered image and the plain image and frequency components of the specific image pattern that does not include the fixed pattern noise are estimated. Then, based on the estimated frequency components, a weight for frequency at the time of calculating the correlation between the registered image and the compared image is controlled.

Patent Document 1: Japanese Unexamined Patent Application Publication No. JP-A 2008-015848
Patent Document 2: Japanese Patent No. 3254622
Patent Document 3: Japanese Patent No. 5331721
Non-Patent Document 1: Toni Takahashi, Kengo Makino, Yuta Kudo, Rui Ishiyama, "A Study of Fast Image Matching Method Under Translation, Scale, and Rotation", IEICE Technical Report, BioX2017-42, PRMU2017-178, March 2018

As described in Patent Document 1, Patent Document 2, or Non-Patent Document 1, in the case of performing matching of a registered image and a compared image based on a synthesized frequency characteristic obtained by synthesizing the frequency characteristic of the registered image and the frequency characteristic of the compared image, when a pattern other than a pattern unique to the registered image is commonly included by the registered image and the compared image, the accuracy of matching decreases. Then, it is considered to apply a technique of reducing the decrease of the accuracy of matching due to a fixed pattern noise commonly included by a registered image and a compared image as described in Patent Document 3

A fixed pattern noise commonly included by a plurality of images handled in Patent Document 3 is a fixed pattern noise unique to an image capturing device, which is a type of pattern that can be captured alone as a plain image. Meanwhile, a pattern commonly included by a plurality of images, which adversely affects the matching, includes a type of pattern that cannot be captured alone. For example, images obtained by capturing the surfaces of a plurality of objects produced by using the same production machine include a pattern unique to the production machine other than a pattern unique to the objects. The latter pattern is a pattern commonly included by a plurality of different images, and it is difficult to capture it alone. In Patent Document 3, in order to determine a weight used in matching, an image in which only a pattern commonly included by a plurality of images that adversely affects the matching is required. Therefore, in the method described in Patent Document 3, when a pattern commonly included by a plurality of images is a pattern that cannot be captured alone, a weight cannot be set, and the accuracy of matching decreases.

SUMMARY

An object of the present invention is to provide an image matching device that solves the abovementioned problem.

An image matching device according to an aspect of the present invention includes a weight determination unit and a matching unit. The weight determination unit is configured to determine a weight relating to frequency based on a difference between a synthesized frequency characteristic and an ideal synthesized frequency characteristic. The synthesized frequency characteristic is obtained by synthesizing a frequency characteristic of a first image with a frequency characteristic of a second image. The ideal synthesized frequency characteristic is an ideal one obtained by synthesizing the frequency characteristic of the first image with the frequency characteristic of the second image. The weight relating to frequency is used in performing matching of the first image and a third image. The matching unit is configured to perform matching of the first image and the third image based on the determined weight.

Further, an image matching method according to another aspect of the present invention includes determining and performing matching. In the determining, a weight relating to frequency is determined based on a difference between a synthesized frequency characteristic and an ideal synthesized frequency characteristic. The synthesized frequency characteristic is obtained by synthesizing a frequency characteristic of a first image with a frequency characteristic of a second image. The ideal synthesized frequency characteristic is an ideal one obtained by synthesizing the frequency characteristic of the first image with the frequency characteristic of the second image. The weight relating to frequency is used in performing matching of the first image and a third image. In the performing matching, matching of the first image and the third image is performed based on the determined weight.

Further, a non-transitory computer-readable recording medium according to another aspect of the present invention has a program recorded thereon. The program includes instructions for causing a computer to function as a weight determination unit and a matching unit. The weight determination unit is configured to determine a weight relating to frequency based on a difference between a synthesized frequency characteristic and an ideal synthesized frequency characteristic. The synthesized frequency characteristic is obtained by synthesizing a frequency characteristic of a first image with a frequency characteristic of a second image. The ideal synthesized frequency characteristic is an ideal one obtained by synthesizing the frequency characteristic of the first image with the frequency characteristic of the second image. The weight relating to frequency is used in performing matching of the first image and a third image. The matching unit is configured to perform matching of the first image and the third image based on the determined weight.

With the configurations described above, the present invention can increase the accuracy of matching of images.

BRIEF DESCRIPTION OF DRAWINGS

FIG. 8 is a view showing an example of equations representing the frequency characteristic of a first image and the frequency characteristic of a second image;

FIG. 9 is a view showing an example of an equation for calculating a normalized cross power spectrum;

FIG. 10 is a view showing an example of equations representing a frequency characteristic $F(k_1, k_2)$, a frequency characteristic $G(k_1, k_2)$ and a normalized cross power spectrum $R(k_1, k_2)$ of a pair of identical images with positional shift;

FIG. 14 is a view showing an equation used in the first example of the ideal synthesized frequency characteristic estimation unit in the image matching device according to the first example embodiment of the present invention;

FIG. 19 is an operation explanation view of the third example of the ideal synthesized frequency characteristic estimation unit in the image matching device according to the first example embodiment of the present invention;

FIG. 22 is an operation explanation view of the fifth example of the ideal synthesized frequency characteristic estimation unit in the image matching device according to the first example embodiment of the present invention;

FIG. 23 is an operation explanation view of a weight calculation unit in the image matching device according to the first example embodiment of the present invention;

FIG. 25 is an operation explanation view of the weight calculation unit in the image matching device according to the first example embodiment of the present invention;

FIG. 26 is an operation explanation view of the weight calculation unit in the image matching device according to the first example embodiment of the present invention;

FIG. 27 is an operation explanation view of the weight calculation unit in the image matching device according to the first example embodiment of the present invention;

EXAMPLE EMBODIMENTS

Next, example embodiments of the present invention will be described in detail with reference to the drawings.

First Example Embodiment

Figure 1:
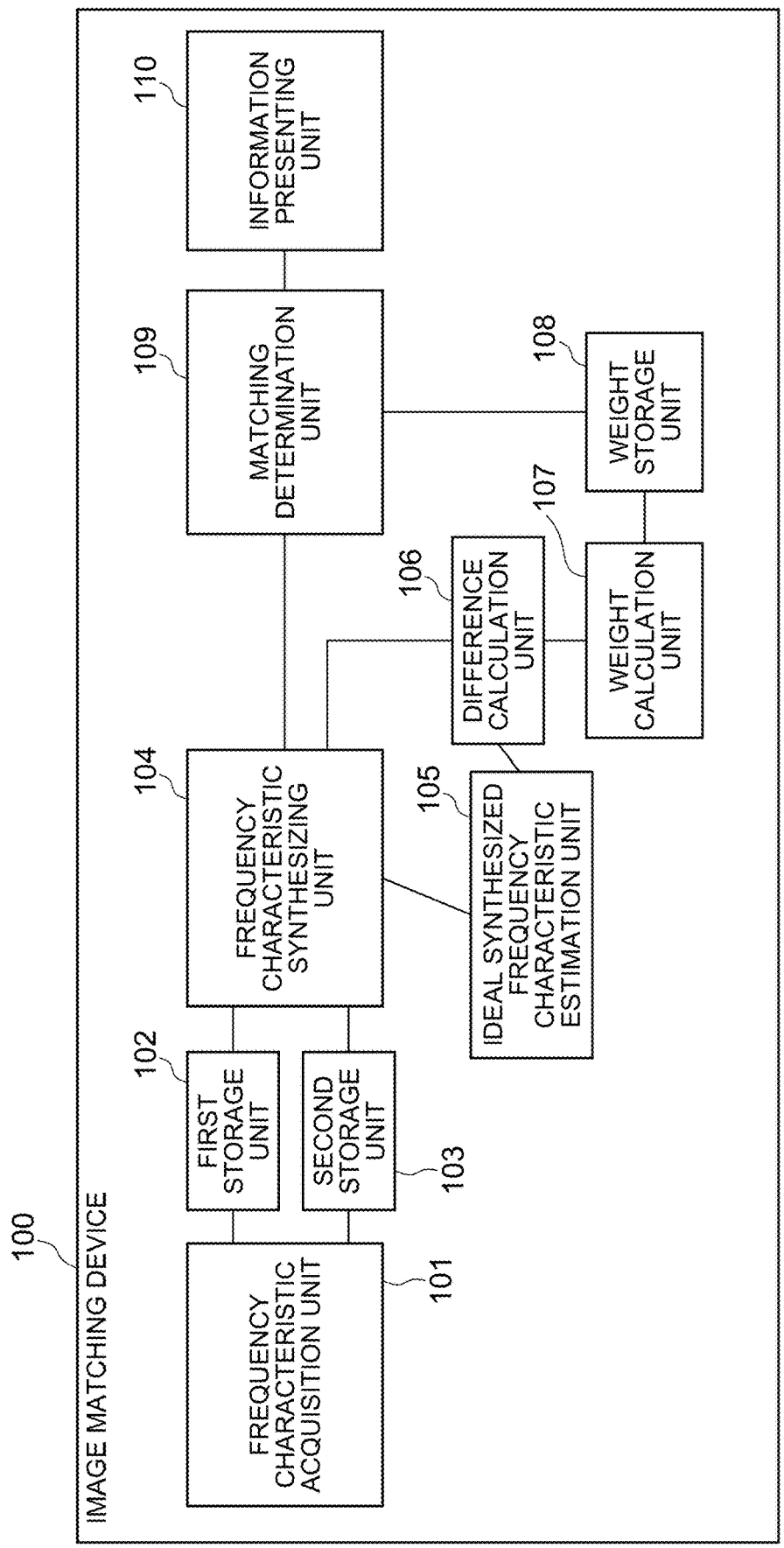
FIG. 1 is a block diagram of an image matching device according to a first example embodiment of the present invention.

FIG. 1 is a block diagram of an image matching device according to a first example embodiment of the present invention. The image matching device 100 according to this example embodiment is configured to determine a frequency weight at the time of performing matching of a plurality of images. Moreover, the image matching device 100 is configured to perform matching of a plurality of images using the determined weight. Referring to FIG. 1, the image matching device 100 includes a frequency characteristic acquisition unit 101, a first storage unit 102, a second storage unit 103, a frequency characteristic synthesizing unit 104, an ideal synthesized frequency characteristic estimation unit 105, a difference calculation unit 106, a weight calculation unit 107, a weight storage unit 108, a matching determination unit 109, and an information presenting unit 110.

The frequency characteristic acquisition unit 101 is configured to acquire frequency characteristics of a first image and a second image. Herein, a frequency characteristic refers to two-dimensional data (two-dimensional array) as a result of applying Fourier transformation (discrete Fourier transformation) to an image and thereby transforming into the frequency domain. Frequency transformation other than Fourier transformation, for example, Wavelet transformation may be performed.

The first image is a registered image obtained by capturing an image of an object to be registered at the time of both weight determination and matching. The second image is an image prepared for determining a weight (may be referred to as a reference image hereinafter) at the time of weight determination, and is a compared image for determining the identity with the registered image at the time of matching.

One or a plurality of first images are present, and one or a plurality of second images are present. An object is, for example, an industrial product, a commercial product, and so on. On the surface of the object, there are fine patterns that naturally occur in the same production process such as fine irregularities or patterns or random patterns of a material surface. By acquiring a difference in such patterns on the surface of the object as an image by using an image capturing device such as a camera, and recognizing the fine patterns, it is possible to perform individual identification and management of each product. This example embodiment relates to image matching for such individual identification.

The first storage unit 102 is configured to store the frequency characteristic of the first image. The second storage unit 103 is configured to store the frequency characteristic of the second image.

The frequency characteristic synthesizing unit 104 is configured to calculate a normalized cross power spectrum of the frequency characteristic of the first image stored in the first storage unit 102 and the frequency characteristic of the second image stored in the second storage unit 102.

The ideal synthesized frequency characteristic estimation unit 105 is configured to calculate an ideal normalized cross power spectrum of the frequency characteristic of the first image stored in the first storage unit 102 and the frequency characteristic of the second image stored in the second storage unit 102.

The difference calculation unit 106 is configured to calculate a difference between the normalized cross power spectrum obtained from the frequency characteristic synthesizing unit 104 and the ideal normalized cross power spectrum obtained from the ideal synthesized frequency characteristic estimation unit 105.

The weight calculation unit 107 is configured to calculate, as a weight, a numerical value (two-dimensional data) representing the degree of validity of each element (frequency component) of the normalized cross power spectrum to matching based on the result of the difference calculated by the difference calculation unit 106. The weight is also referred to as a characteristic selection parameter.

The weight storage unit 108 is configured to store the weight obtained from the weight calculation unit 107. The weight storage unit 108 can be configured to store the weight used at the time of performing matching of the first image and the compared image in association with the first image.

The matching determination unit 109 is configured to calculate a score representing the degree of similarity between the frequency characteristic of the first image and the frequency characteristic of the second image based on the normalized cross power spectrum obtained by the frequency characteristic synthesizing unit 104 and the weight stored in the weight storage unit 108. The matching determination unit 109 is also configured to determine whether the first image and the second image are identical or not based on the calculated score.

The information presenting unit 110 is configured to display the result whether the first image and the second image are identical or not based on the result of determination by the matching determination unit 109.

Figure 2:
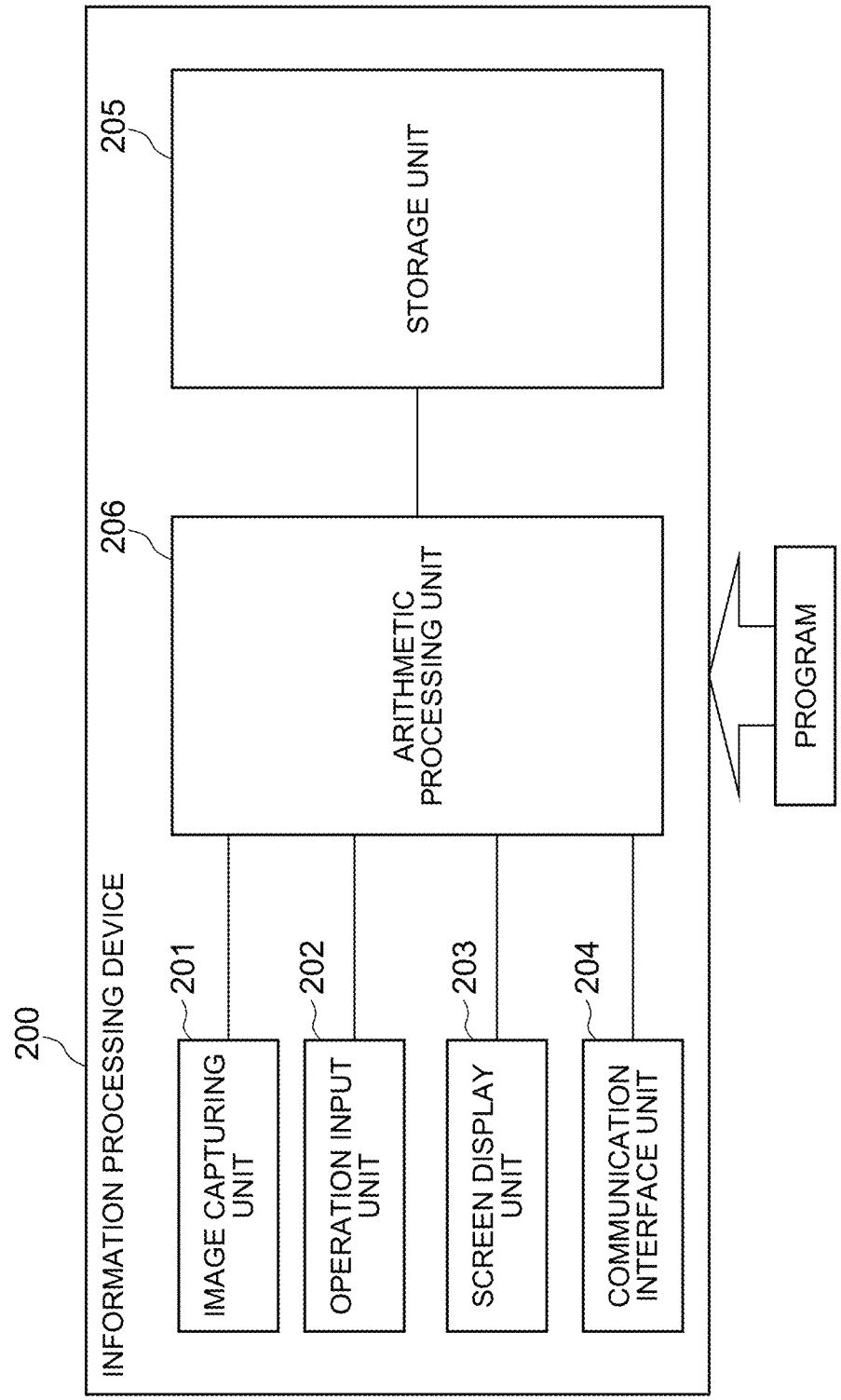
FIG. 2 is a block diagram showing an example of a hardware configuration of the image matching device according to the first example embodiment of the present invention.

For example, as shown in FIG. 2, the image matching device 100 can be realized by an information processing device 200 and a program 207. The information processing device 200 includes an image capturing unit 201 such as a camera, an operation input unit 202 such as a keyboard and a mouse, a screen display unit 203 such as a liquid crystal display, a communication interface unit 204, a storage unit 205 such as a memory and a hard disk, and an arithmetic processing unit 206 such as one or more microprocessors. The information processing device 200 may be, for example, a personal computer or a smartphone.

The program 207 is loaded into a memory from an external computer-readable storage medium when the information processing device 200 is started. The program 207 controls the operation of the arithmetic processing unit 206 to realize, on the arithmetic processing unit 206, functional units such as the frequency characteristic acquisition unit 101, the first storage unit 102, the second storage unit 103, the frequency characteristic synthesizing unit 104, the ideal synthesized frequency characteristic estimation unit 105, the difference calculation unit 106, the weight calculation unit 107, the weight storage unit 108, the matching determination unit 109, and the information presenting unit 110.

Next, the outline of the operation of the image matching device 100 according to this example embodiment will be described.

The operation of the image matching device 100 is broadly divided into an offline operation to set a weight beforehand and an online operation to perform matching of two images using the set weight. The operations will be described below, respectively.

<Offline Operation (Automatic Weight Setting)>

Figure 3:
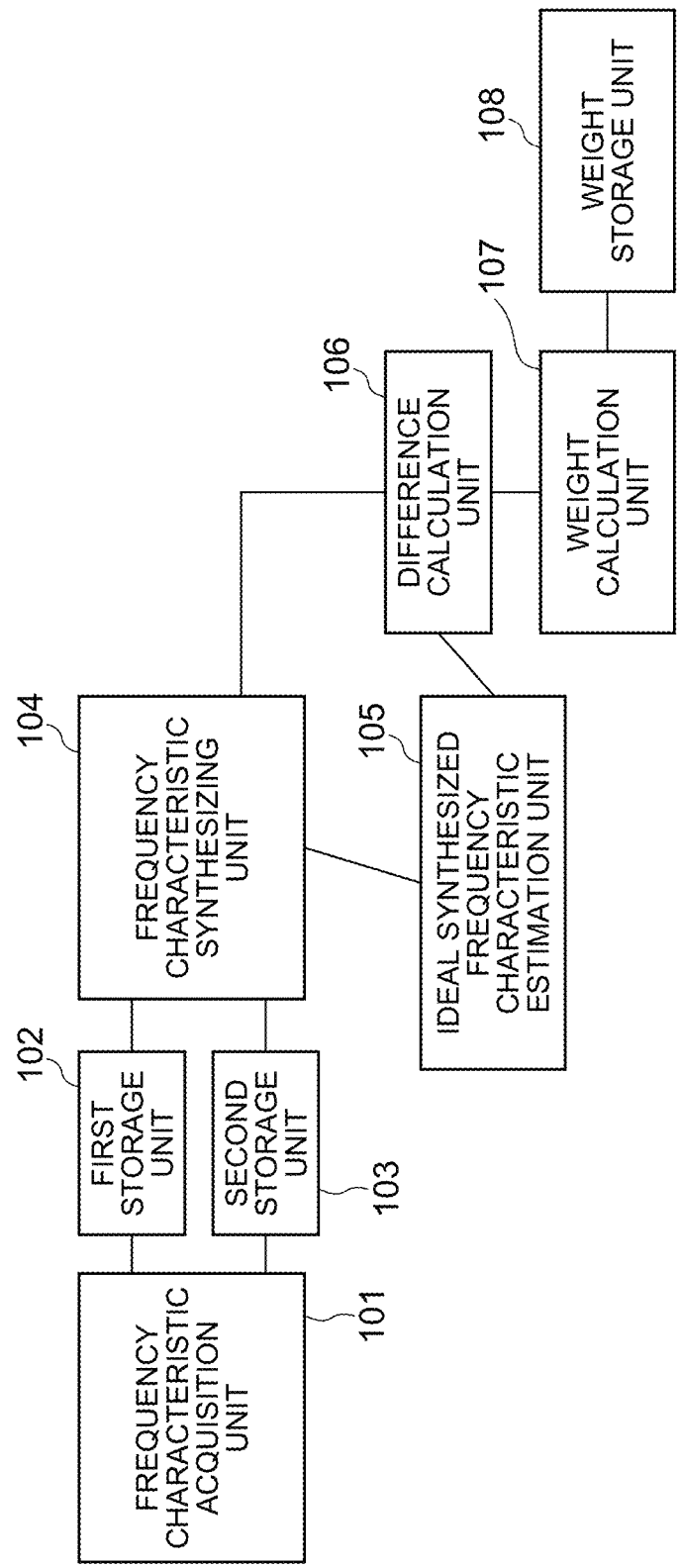
FIG. 3 is a diagram showing components relating to weight calculation of the image matching device according to the first example embodiment of the present invention.
Figure 4:
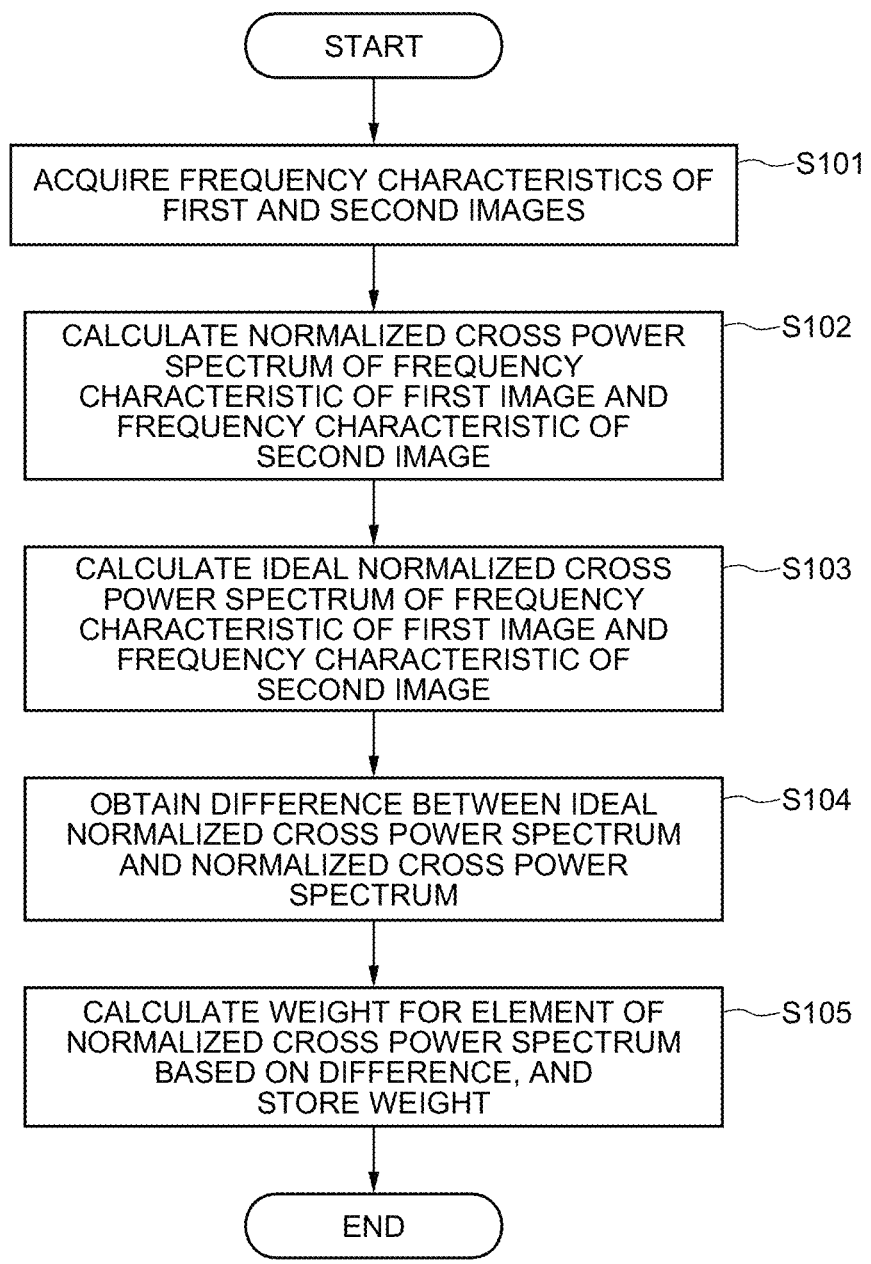
FIG. 4 is a flowchart showing the outline of a weight calculation operation of the image matching device according to the first example embodiment of the present invention.

FIG. 3 is a block diagram showing only processing units that function at the time of the offline operation of the image matching device 100. FIG. 4 is a flowchart showing the outline of the offline operation of the image matching device 100.

First, the frequency characteristic acquisition unit 101 acquires the frequency characteristics of the first and second images and teaching data, which is a determination result expected at the time of matching (step S101). The teaching data represents whether the first image and the second image are a pair of identical images or a pair of different images. In a case where there are a plurality of first images, the frequency characteristic acquisition unit 101 acquires a frequency characteristic from each of the first images. In a case where there are a plurality of second images, the frequency characteristic acquisition unit 101 acquires a frequency characteristic from each of the second images. The frequency characteristic acquisition unit 101 stores the acquired frequency characteristic of the first image into the first storage unit 102, and stores the acquired frequency characteristic of the second image into the second storage unit 103.

Next, the frequency characteristic synthesizing unit 104 calculates a normalized cross power spectrum of the frequency characteristic of the first image stored in the first storage unit 102 and the frequency characteristic of the second image stored in the second storage unit 103 (step S102). In a case where there are a plurality of frequency characteristics of the first images and a plurality of frequency characteristics of the second images, the frequency characteristic synthesizing unit 104 calculates a plurality of normalized cross power spectrums of the respective frequency characteristics of the first images and the respective frequency characteristics of the second images.

Next, the ideal synthesized frequency characteristic estimation unit 105 calculates an ideal normalized cross power spectrum of the frequency characteristic of the first image stored in the first storage unit 102 and the frequency characteristic of the second image stored in the second storage unit 103 (step S103). In a case where there are a plurality of frequency characteristics of the first images and a plurality of frequency characteristics of the second images, the ideal synthesized frequency characteristic estimation unit 105 calculates a plurality of ideal normalized cross power spectrums of the respective frequency characteristics of the first images and the respective frequency characteristics of the second images.

Next, the difference calculation unit 106 calculates a difference between the normalized cross power spectrum calculated by the frequency characteristic synthesizing unit 104 and the corresponding ideal normalized cross power spectrum calculated by the ideal synthesized frequency characteristic estimation unit 105 (step S104).

Next, the weight calculation unit 107 calculates a numerical value indicating the degree of usefulness of each component (element) of the frequency characteristics for matching, as a weight for each element, based on difference data calculated by the difference calculation unit 106 (step S105). In the weight storage unit 108, the weight for each component (element) of the frequency characteristics calculated by the weight calculation unit 107.

<Online Operation (Image Matching Using Set Weight)>

Subsequently, the outline of the online operation to perform matching of two images using a set weight will be described.

Figure 5:
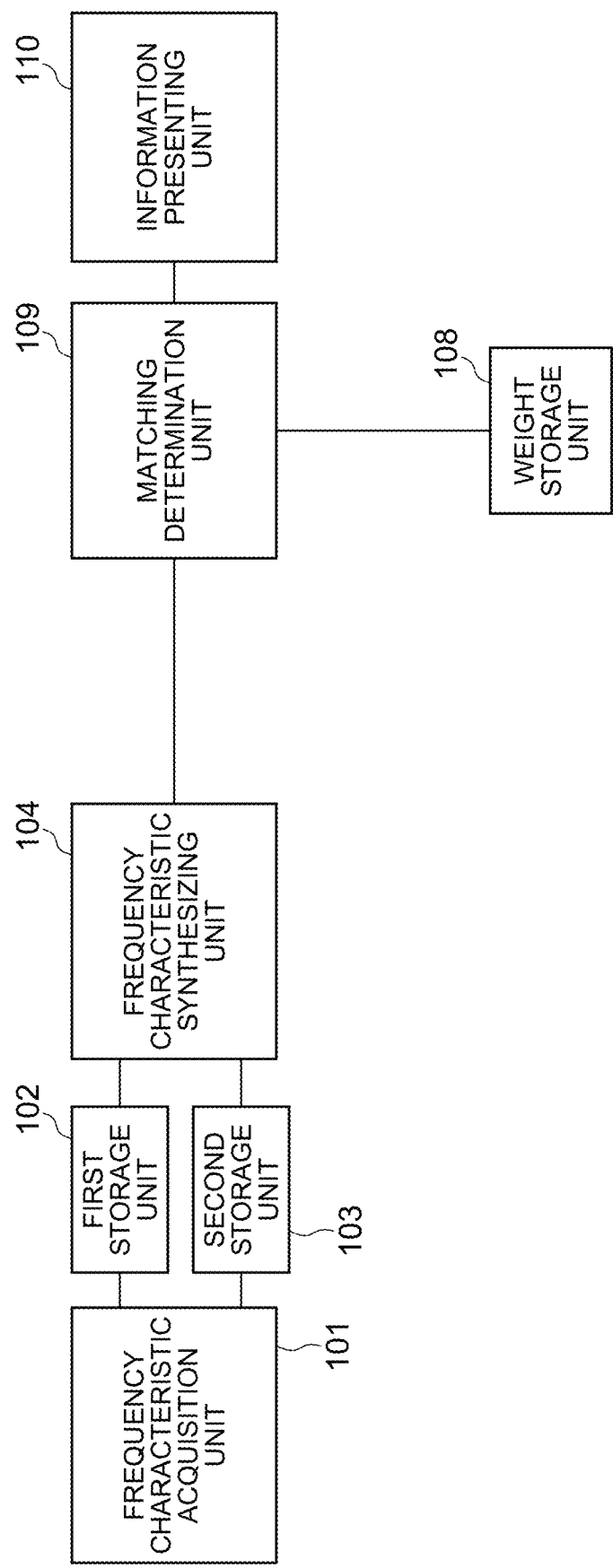
FIG. 5 is a diagram showing components relating to matching of the image matching device according to the first example embodiment of the present invention.
Figure 6:
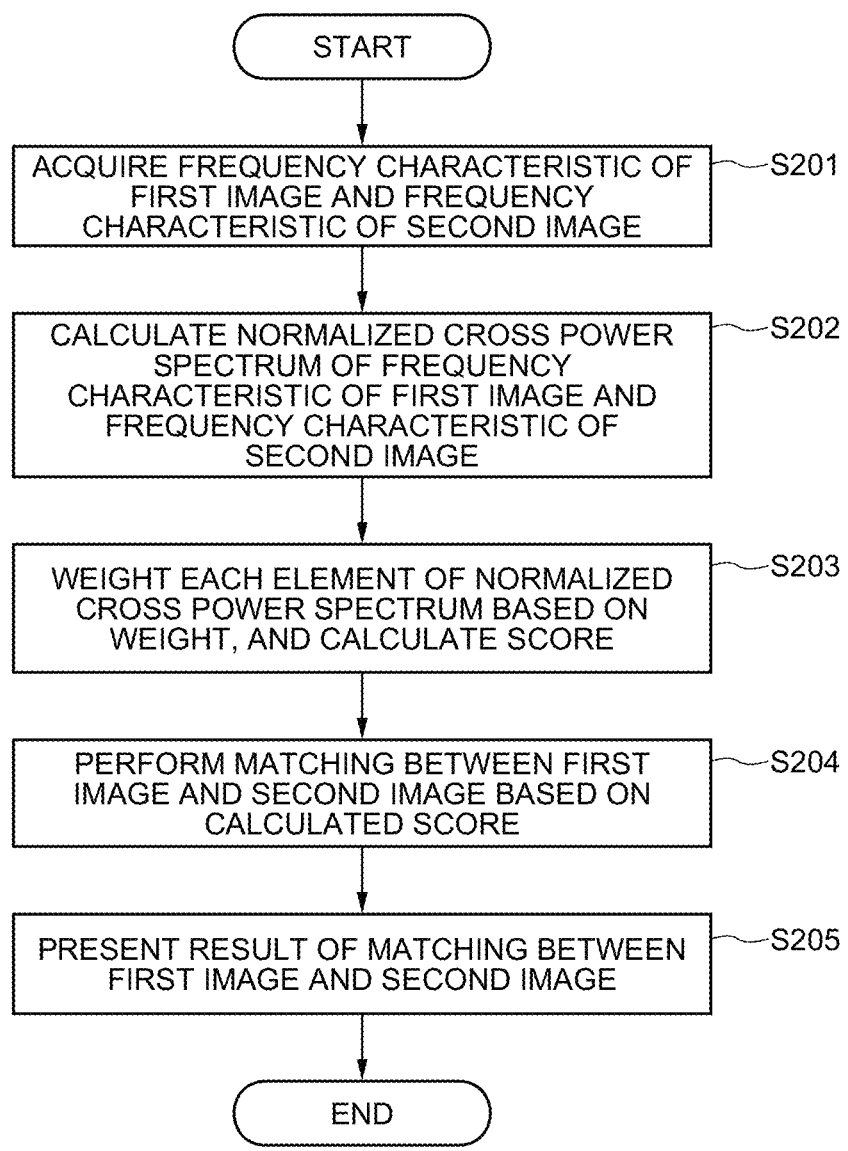
FIG. 6 is a flowchart showing the outline of a matching operation of the image matching device according to the first example embodiment of the present invention.

FIG. 5 is a block diagram showing only processing units that function at the time of the online operation of the image matching device 100. FIG. 6 is a flowchart showing the outline of the online operation of the image matching device 100.

First, the frequency characteristic acquisition unit 101 acquires the frequency characteristic of the first image and the frequency characteristic of the second image (step S201). In a case where there are a plurality of first images, the frequency characteristic acquisition unit 101 acquires a frequency characteristic from each of the first images. In a case where there are a plurality of second images, the frequency characteristic acquisition unit 101 acquires a frequency characteristic from each of the second images. The frequency characteristic acquisition unit 101 stores the acquired frequency characteristic of the first image into the first storage unit 102, and stores the acquired frequency characteristic of the second image into the second storage unit 103.

Next, the frequency characteristic synthesizing unit 104 calculates a normalized cross power spectrum of the frequency characteristic of the first image stored in the first storage unit 102 and the frequency characteristic of the second image stored in the second storage unit 103 (step S202). In a case where there are a plurality of frequency characteristics of the first images and a plurality of frequency characteristics of the second images, the frequency characteristic synthesizing unit 104 calculates a plurality of normalized cross power spectrums of the respective frequency characteristics of the first images and the respective frequency characteristics of the second images.

Next, the matching determination unit 109 weights the normalized cross power spectrum output from the frequency characteristic synthesizing unit 104 based on the weight stored in the weight storage unit 108, and calculates a score indicating the degree of similarity between the frequency characteristic of the first image and the frequency characteristic of the second image based on the weighted normalized cross power spectrum (step S203). Next, the matching determination unit 109 performs matching of the first image and the second image, that is, determination whether the first image and the second image are identical or not, based on the calculated score (step S204).

Next, the information presenting unit 110 presents the result of matching of the first image and the second image (step S205). For example, the information presenting unit 110 displays the matching result on a display device, and/or transmits the matching result to an external terminal or the like.

<Details of Respective Units>

Next, the details of the respective units of the image matching device 100 according to this example embodiment will be described.

First, the frequency characteristic acquisition unit 101 will be described in detail.

Figure 7:
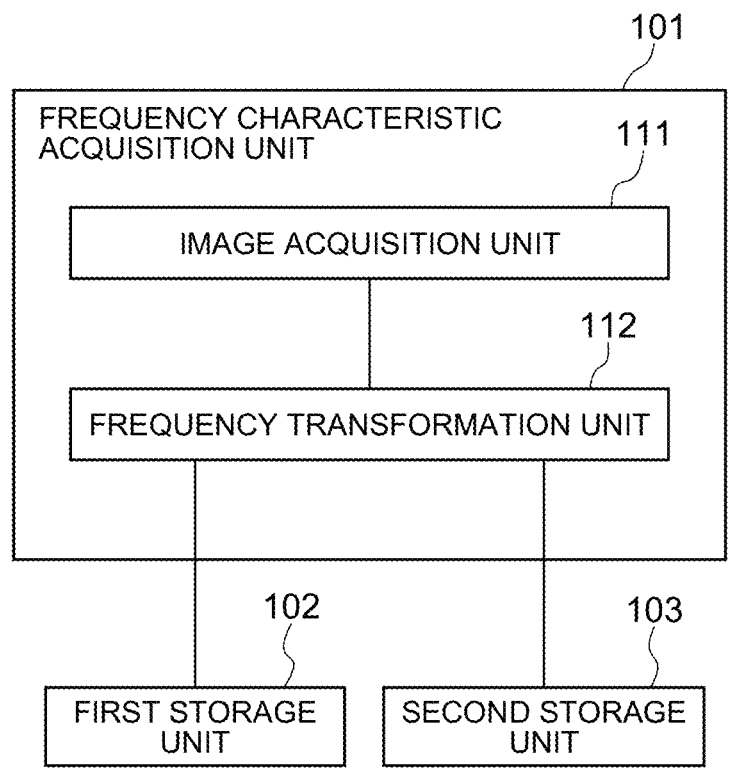
FIG. 7 is a block diagram showing an example of a frequency characteristic acquisition unit in the image matching device according to the first example embodiment of the present invention.

FIG. 7 is a block diagram showing an example of the frequency characteristic acquisition unit 101. The frequency characteristic acquisition unit 101 of this example includes an image acquisition unit 111 and a frequency transformation unit 112.

The image acquisition unit 111 is configured to acquire the first image and the second image. The image acquisition unit 111 can be an image capturing device represented by a camera or a scanner, for example. Alternatively, the image acquisition unit 111 may be an optical sensor that collects visible light and light having a wavelength longer than visible light such as near-infrared light, short-wavelength infrared light and thermal infrared light with a lens and acquires the shape of a target object, or the like, as image data. Alternatively, the image acquisition unit 111 may be a sensor that acquires the intensity of infrared light, ultraviolet light or X-ray and outputs it as a two-dimensional data array. Alternatively, the image acquisition unit 111 may be configured to acquire the first image and the second image from an external storage medium such as a CD-ROM or a memory. Alternatively, the image acquisition unit 111 may be configured to receive the first image and the second image via a network. Besides, the image acquisition unit 111 may acquire the first image and the second image by different methods.

The frequency transformation unit 112 is configured to receive the first image and the second image from the image acquisition unit 111, and output two-dimensional data (two-dimensional array) as a result of applying discrete Fourier transformation on each of the images. The frequency transformation unit 112 stores the two-dimensional data (two-dimensional array) obtained as a result of applying discrete Fourier transformation of the first image as a first frequency characteristic into the first storage unit 102, and stores the two-dimensional data (two-dimensional array) as a result of applying discrete Fourier transformation of the second image as a second frequency characteristic into the second storage unit 103.

Next, an example of the frequency characteristics of the first and second images acquired by the frequency characteristic acquisition unit 101 will be described.

Let the first image and the second image be two images $f(n_1,n_2)$ and $g(n_1,n_2)$ of $N_1 \times N_2$ pixels. Moreover, let a discrete space index (integer) of a two-dimensional image signal be $n_1=-M_1, \ldots, M_1$ and $n_2=-M_2, \ldots, M_2$. Herein, $M_1$ and $M_2$ are positive integers, and $N_1=2M_1+1$ and $N_2=2M_2+1$. Then, the first frequency characteristic $F(k_1,k_2)$ obtained by performing two-dimensional discrete Fourier transformation on the image $f(n_1,n_2)$ and the second frequency characteristic $G(k_1,k_2)$ obtained by performing two-dimensional discrete Fourier transformation on the image $g(n_1,n_2)$ are given by Equations 1 and 2 shown in FIG. 8. In Equations 1 and 2, $k_1=-M_1, \ldots, M_1$ and $k_2=-M_2, \ldots, M_2$ are discrete frequency indexes (integers). Moreover, $W_{N_1}$ and $W_{N_2}$ are twiddle factors, which are given by Equations 3 and 4 shown in FIG. 8. Moreover, $A_F(k_1,k_2)$ and $A_G(k_1,k_2)$ represent amplitude spectrums (amplitude components), and $\theta_F(k_1,k_2)$ and $\theta_G(k_1,k_2)$ represent phase spectrums (phase components), respectively. Moreover, $\Sigma_{n_1,n_2}$ represents addition over the entire index range as shown in Equation 5 in FIG. 8.

Next, the frequency characteristic synthesizing unit 104 will be described in detail.

The frequency characteristic synthesizing unit 104 calculates a normalized cross power spectrum $R(k_1,k_2)$ of the first frequency characteristic $F(k_1,k_2)$ and the second frequency characteristic $G(k_1,k_2)$ using Equation 6 shown in FIG. 9. In Equation 6, overline $G(k_1,k_2)$ is a complex conjugate of the second frequency characteristic $G(k_1,k_2)$. Moreover, $\theta_F(k_1,k_2)-\theta_G(k_1,k_2)$ is a phase difference spectrum of the first frequency characteristic and the second frequency characteristic. As shown in Equation 6, the frequency characteristic synthesizing unit 104 obtains a cross power spectrum that is the product for each element of the first frequency characteristic $F(k_1,k_2)$ and the complex conjugate of the second frequency characteristic $G(k_1,k_2)$, and normalizing with the absolute value thereof, thereby calculating the normalized cross power spectrum.

In a case where the image $f(n_1,n_2)$ and the image $g(n_1,n_2)$ are a pair of identical images with positional shift, the frequency characteristic $F(k_1,k_2)$, the frequency characteristic $G(k_1,k_2)$, and the normalized cross power spectrum $R(k_1,k_2)$ of the two frequency characteristics are given by Equations 7, 8 and 9 shown in FIG. 10. Herein, $\delta_1$ and $\delta_2$ denote the amount of positional shift between the image $f(n_1,n_2)$ and the image $g(n_1,n_2)$. That is to say, the image $g(n_1,n_2)$ is an image obtained by translating the image $f(n_1,n_2)$ by $(\delta_1,\delta_2)$. As shown in Equation 9, in a case where the two frequency characteristics $F(k_1,k_2)$ and $G(k_1,k_2)$ on which matching is performed are a pair of identical images, the normalized cross power spectrum $R(k_1,k_2)$ is expressed as a complex sine wave having a single period for each of the dimensions (each of $k_1$ and $k_2$). On the other hand, in a case where the two frequency characteristics $F(k_1,k_2)$ and $G(k_1,k_2)$ on which matching is performed are not a pair of identical images, the normalized cross power spectrum $R(k_1,k_2)$ is not a complex sine wave having a single period for each of the dimensions.

Subsequently, the ideal synthesized frequency characteristic estimation unit 105 will be described in detail.

Figure 11:
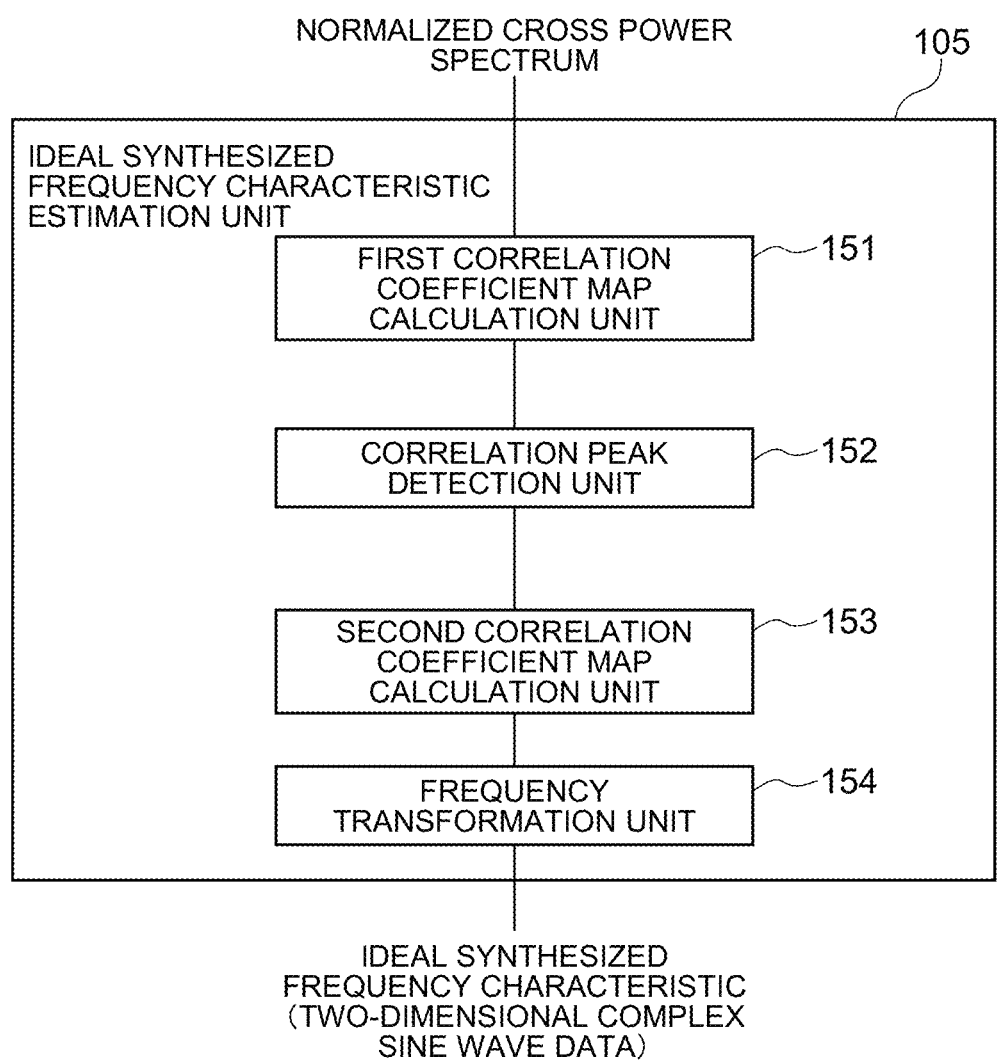
FIG. 11 is a block diagram showing a first example of an ideal synthesized frequency characteristic estimation unit in the image matching device according to the first example embodiment of the present invention.

FIG. 11 is a block diagram showing an example of the ideal synthesized frequency characteristic estimation unit 105. The ideal synthesized frequency characteristic estimation unit 105 of this example includes a first correlation coefficient map calculation unit 151, a correlation peak detection unit 152, a second correlation coefficient map calculation unit 153, and a frequency transformation unit 154.

The first correlation map calculation unit 151 performs inverse Fourier transformation on the normalized cross power spectrum output from the frequency characteristic synthesizing unit 104 to calculate a first correlation coefficient map.

In a case where the first image and the second image are a pair of identical images, the normalized cross power spectrum thereof is ideally expressed by a complex sine wave having a single period for each dimension as described above. Therefore, a correlation coefficient map obtained by performing inverse Fourier transformation thereon becomes a delta function having a steep peak at a position corresponding to the amount of positional shift. However, even in the case of a pair of identical images, when there is variation or loss in a pattern that is caused by a positioning error at the time of image capturing, variation in illumination, noise and so on between the first image and the second image, variation occurs in part between the frequency characteristic of the first image and the frequency characteristic of the second image. The components (elements) of the frequency characteristics having varied in part do not have a shape of a complex sine wave having a single period on the normalized cross power spectrum, but become noise as in a normalized cross power spectrum shown in FIG. 12. Due to this influence, in the correlation coefficient map obtained by performing inverse Fourier transformation on the normalized cross power spectrum of a pair of identical images, energy does not concentrate in specific real space coordinates, and the peak of the correlation coefficient map decreases. Moreover, the elements (components) of the frequency characteristics that are noise disperse on the real space due to the inverse Fourier transformation, and the correlation coefficient map has noise superimposed.

Subsequently, the correlation peak detection unit 152 detects, from the first correlation coefficient map that is output from the first correlation coefficient map calculation unit 151, the maximum value of the correlation coefficient map, the real space coordinates of the maximum value and the correlation coefficient data of the vicinity of the maximum value, and outputs them.

Figure 12:
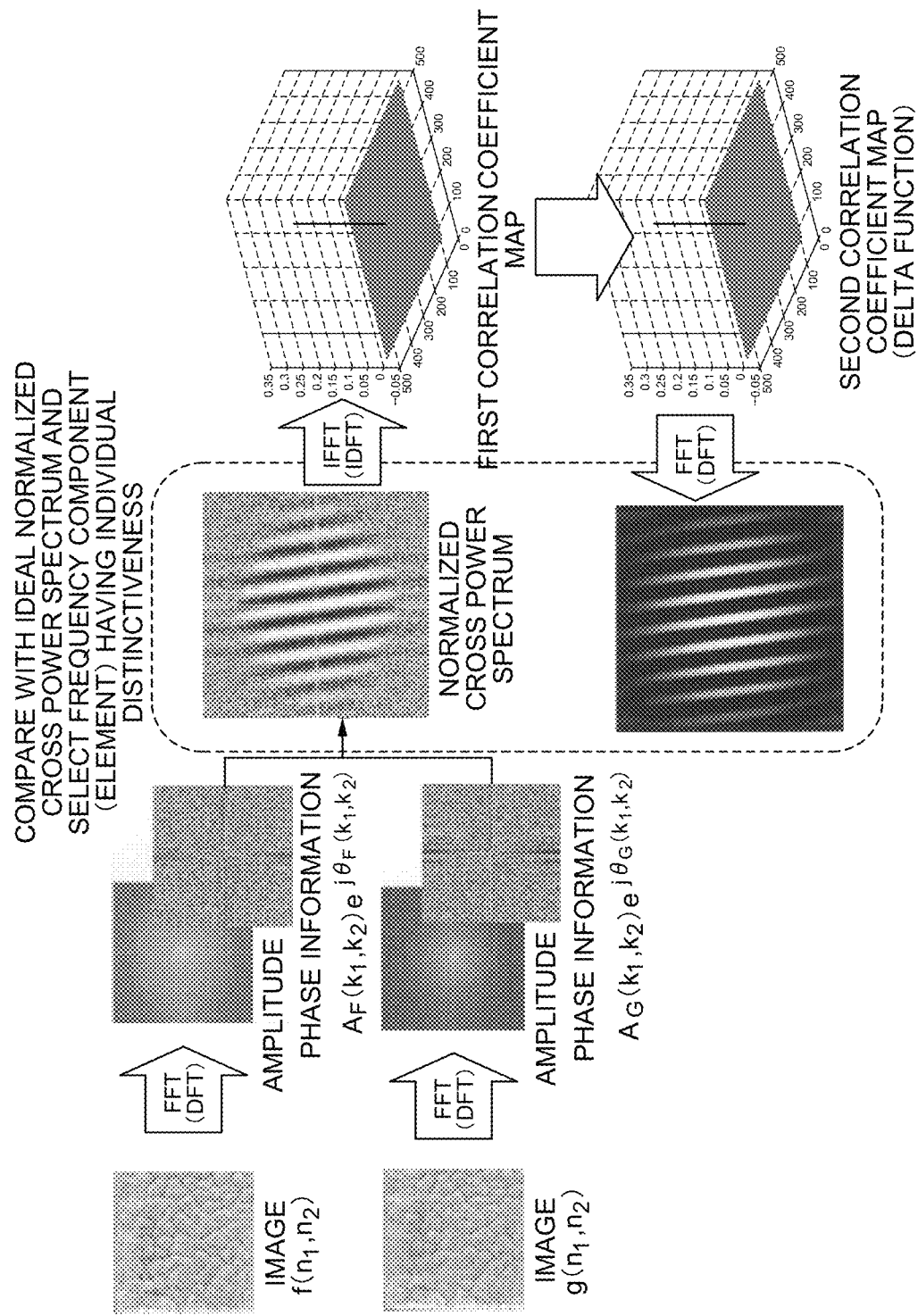
FIG. 12 is an operation explanation view of the first example of the ideal synthesized frequency characteristic estimation unit in the image matching device according to the first example embodiment of the present invention.

Subsequently, the second correlation coefficient map calculation unit 153 estimates a second correlation coefficient map, which is an ideal correlation coefficient map expected from the first image and the second image that are a pair of identical images, based on the maximum value of the first correlation coefficient map, the position of the maximum value and the correlation coefficient data of the vicinity of the maximum value that are output from the correlation peak detection unit 152, and outputs the second correlation coefficient map. That is to say, in a case where the first image and the second image are a pair of identical images, for example, the second correlation coefficient map calculation unit 153 calculates the second correlation coefficient map as a delta function having a peak at the real space coordinates corresponding to the amount of positional shift between the first image and the second image (FIG. 12).

Figure 13:
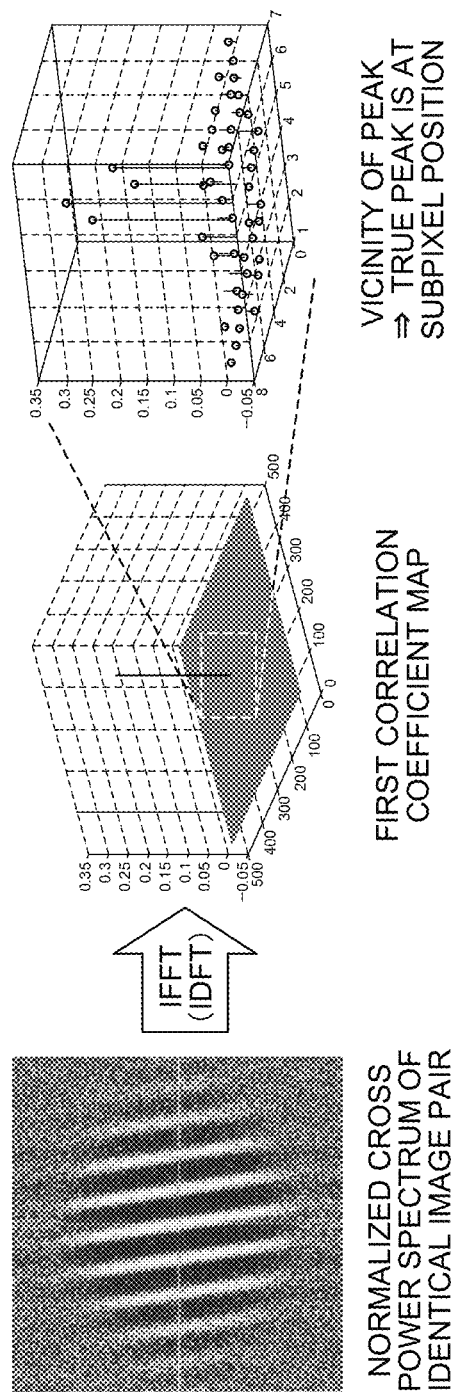
FIG. 13 is an operation explanation view of the first example of the ideal synthesized frequency characteristic estimation unit in the image matching device according to the first example embodiment of the present invention.
Figure 15:
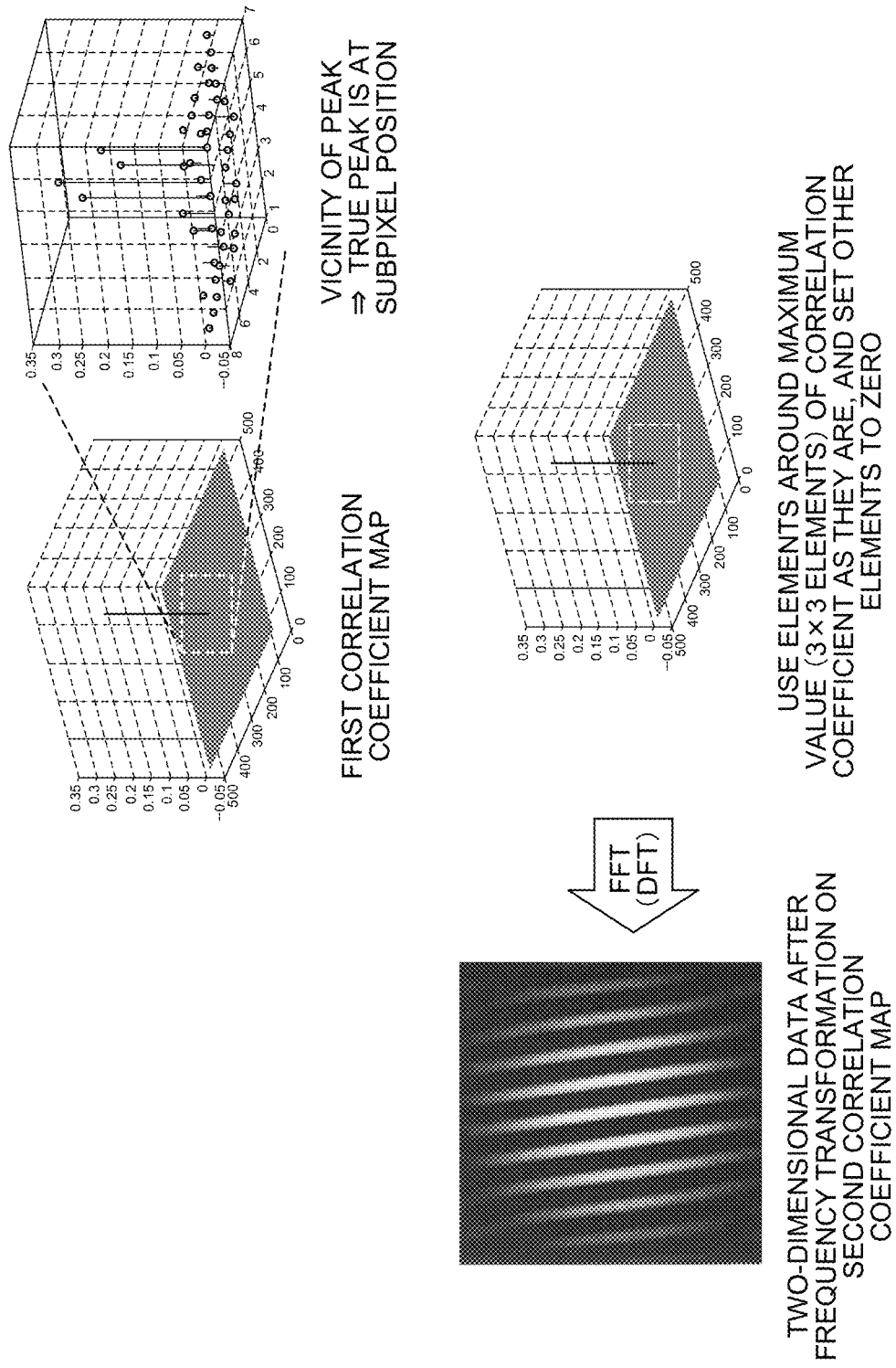
FIG. 15 is an operation explanation view of the first example of the ideal synthesized frequency characteristic estimation unit in the image matching device according to the first example embodiment of the present invention.

In the above example, the second correlation coefficient map calculation unit 153 calculates the second correlation coefficient map as a delta function having a peak in the position of the maximum value of the first correlation coefficient map. Meanwhile, the second correlation coefficient calculation map 153 may define the second correlation coefficient map using the peak of the first correlation coefficient map and the elements in the vicinity of the peak (for example, within an area of 3×3 or 5×5) as shown in FIG. 13. To be specific, the second correlation coefficient map calculation unit 153 may obtain the second correlation coefficient map by fitting a function of Equation 10 shown in FIG. 14 to the peak and the values in the vicinity thereof. Alternatively, as shown in FIG. 15, the second correlation coefficient map calculation unit 153 may obtain, as the second correlation coefficient map, two-dimensional data (two-dimensional array) in which the value of the peak of the first correlation coefficient map and the values of the vicinity thereof are used as they are and the values of the other elements are approximated to 0. By thus using not only the value of the position of the peak but also the correlation value of the vicinity thereof from the first correlation coefficient map, even when there is a position shift in sub-pixel level between the first image and the second image that are a pair of identical images, it is possible to eliminate the influence of the positional shift and estimate an ideal correlation coefficient map.

Referring to FIG. 11 again, subsequently, the frequency transformation unit 154 performs Fourier transformation on the second correlation coefficient map that is output from the second correlation coefficient map calculation unit 153 to transform into two-dimensional data (two-dimensional array) in the frequency domain representation of the second correlation coefficient map. This two-dimensional data is an ideal normalized cross power spectrum.

The example of the configuration of the ideal synthesized frequency characteristic estimation unit 105 has been described above with reference to FIGS. 11 to 15. However, the ideal synthesized frequency characteristic estimation unit 105 is not limited to the above configuration. Below, another configuration example of the ideal synthesized frequency characteristic estimation unit 105 will be described.

Figure 16:
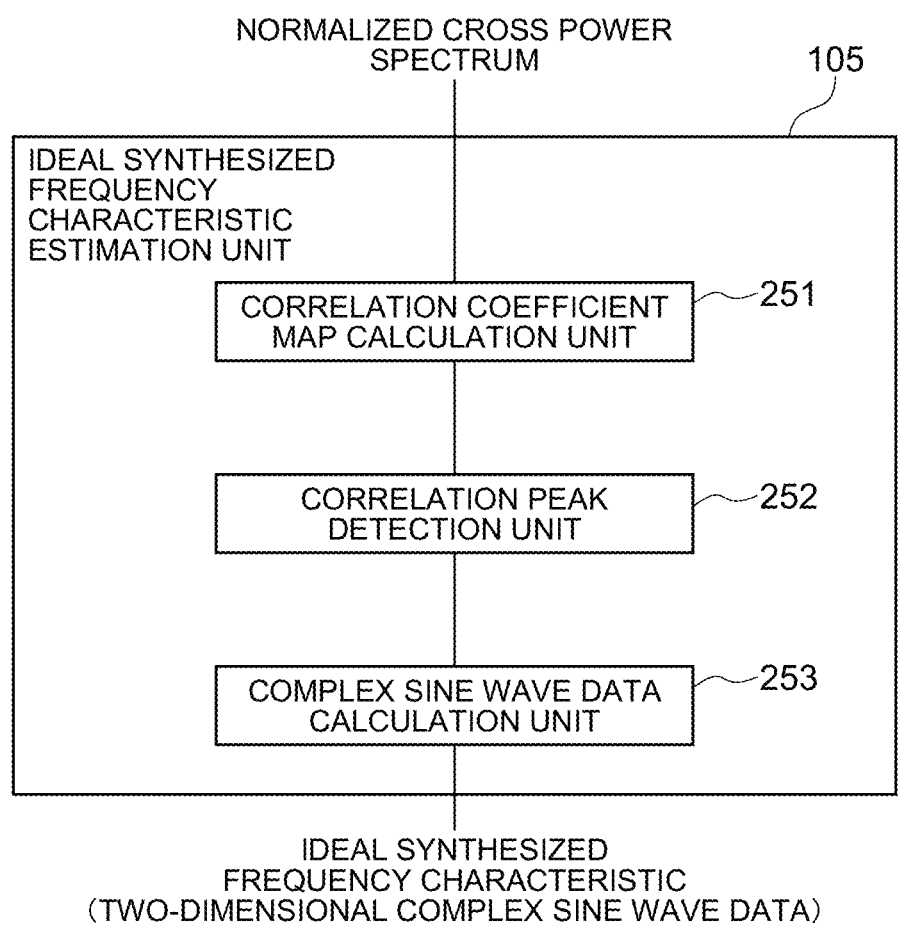
FIG. 16 is a block diagram showing a second example of the ideal synthesized frequency characteristic estimation unit in the image matching device according to the first example embodiment of the present invention.

FIG. 16 is a block diagram showing a second configuration example of the ideal synthesized frequency characteristic estimation unit 105. The ideal synthesized frequency characteristic estimation unit 105 shown in FIG. 16 includes a correlation coefficient map calculation unit 251, a correlation peak detection unit 252, and a complex sine wave data calculation unit 253.

Figure 17:
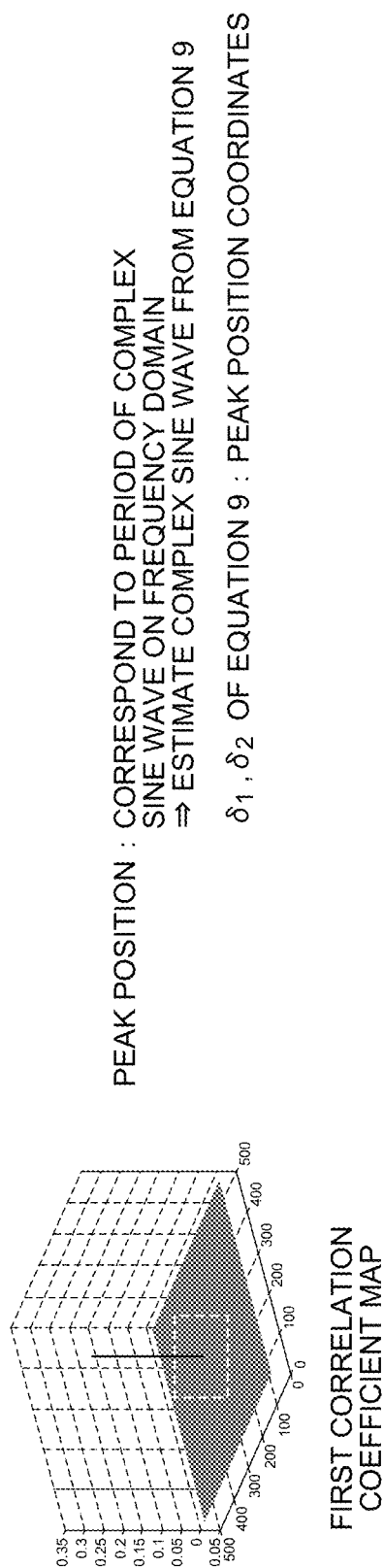
FIG. 17 is an operation explanation view of the second example of the ideal synthesized frequency characteristic estimation unit in the image matching device according to the first example embodiment of the present invention.

The correlation coefficient map calculation unit 251 is configured to, in the same manner as the first correlation coefficient map calculation unit 151, perform inverse Fourier transformation on the normalized cross power spectrum output from the frequency characteristic synthesizing unit 104 to calculate the correlation coefficient map. The correlation peak detection unit 252 is configured to calculate a position on the real space where the correlation coefficient becomes maximum from the correlation coefficient map calculated by the correlation coefficient map calculation unit 251. The position calculated at this time corresponds to the amount of positional shift in a case where the first image and the second image are a pair of identical images. The complex sine wave data calculation unit 253 is configured to calculate two-dimensional complex sine wave data based on the position in the real space calculated by the correlation peak detection unit 252 and Equation 9 shown in FIG. 10. That is to say, as shown in FIG. 17, the complex sine wave data calculation unit 253 substitutes the coordinates δ1, δ2 of the peak position calculated by the correlation peak detection unit 252 into Equation 9 to calculate two-dimensional complex sine wave data that gives a normalized cross power spectrum which is ideal when the first image and the second image are a pair of identical images.

Figure 18:
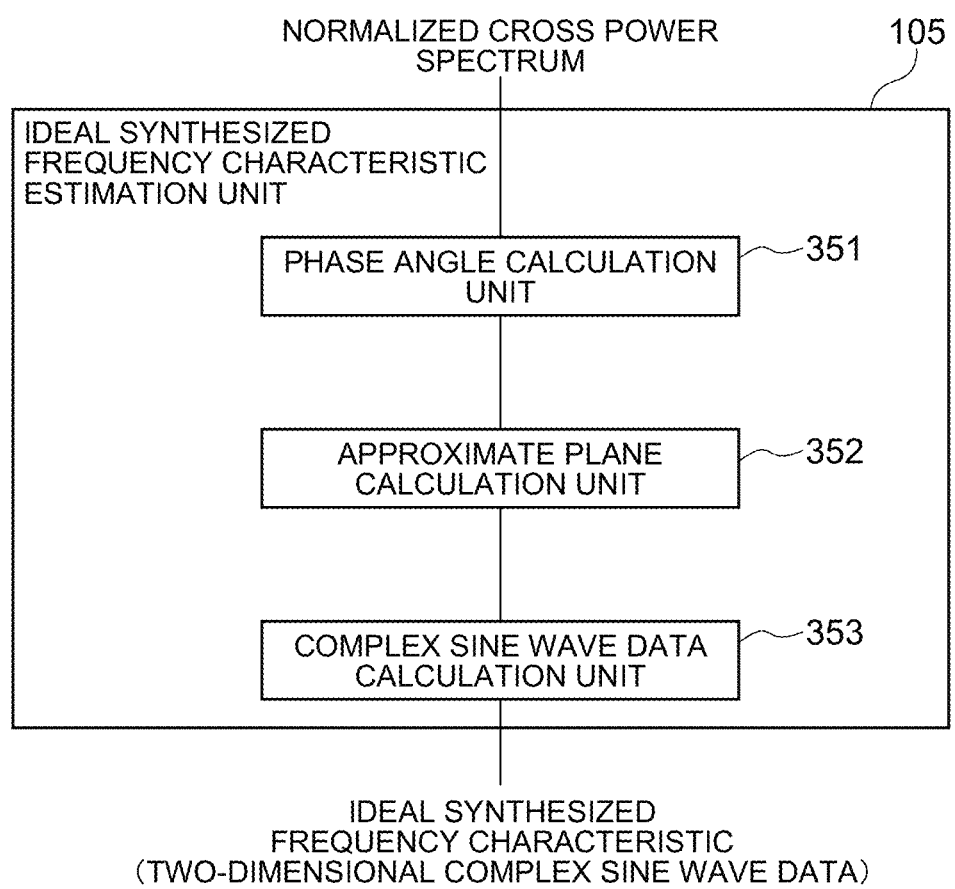
FIG. 18 is a block diagram showing a third example of the ideal synthesized frequency characteristic estimation unit in the image matching device according to the first example embodiment of the present invention.

FIG. 18 is a block diagram showing a third configuration example of the ideal synthesized frequency characteristic estimation unit 105. The ideal synthesized frequency characteristic estimation unit 105 shown in FIG. 18 includes a phase angle calculation unit 351, an approximate plane calculation unit 352, and a complex sine wave data calculation unit 353.

The phase angle calculation unit 351 is configured to calculate a phase angle $\angle(k_1, k_2)$ of each element of the normalized cross power spectrum of the first image and the second image that are a pair of identical images output from the frequency characteristic synthesizing unit 104. FIG. 19 shows an example of an equation for calculating the phase angle $\angle R(k_1, k_2)$.

Further, the approximate plane calculation unit 352 is configured to calculate an approximate plane from the phase angles of the respective elements calculated by the phase angle calculation unit 351. The approximate plane referred to herein is a plane that, assuming the group of elements of the normalized cross power spectrum is three-dimensional point cloud data in which each of the elements is three-dimensional data ($k_1$, $k_2$, $\angle R(k_1,k_2)$) of $k_1$, $k_2$ and $\angle R(k_1, k_2)$, minimizes the sum of squared distances to the point cloud. The approximate plane is also called the least squares plane. FIG. 19 shows an example of a triaxial graph showing the distribution of the three-dimensional point cloud data of the normalized cross power spectrum data. The axes of the graph are three axes; the $k_1$ axis, the $k_2$ axis, and the $\angle R(k_1,k_2)$ axis (frequency axis). One dot corresponds to three-dimensional data ($k_1$, $k_2$, $\angle R(k_1,k_2)$) of one element of the normalized cross power spectrum.

Further, as shown in FIG. 19, the complex sine wave data calculation unit 353 is configured to calculate two-dimensional complex sine wave data that gives a normalized cross power spectrum which is ideal when the first image and the second image are a pair of identical images, based on the slope of the approximate plane calculated by the approximate plane calculation unit 352 (that is, the slope of the phase angle) and Equation 9 shown in FIG. 10.

Figure 20:
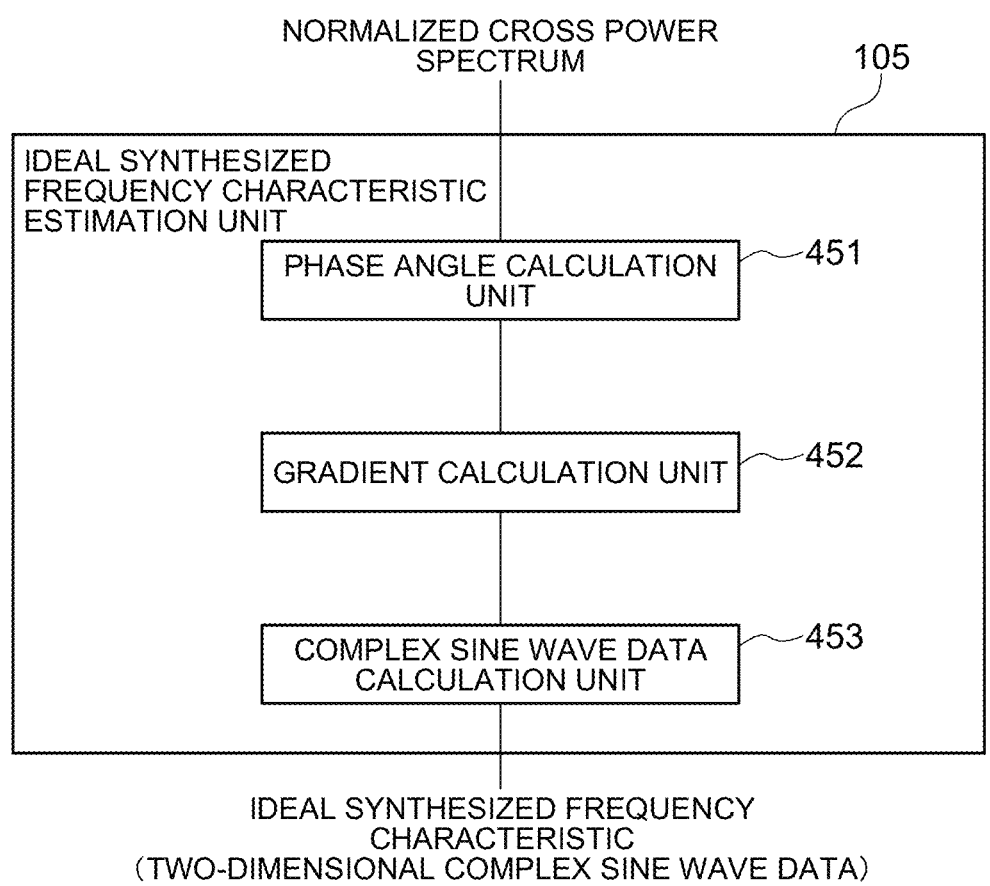
FIG. 20 is a block diagram showing a fourth example of the ideal synthesized frequency characteristic estimation unit in the image matching device according to the first example embodiment of the present invention.

FIG. 20 is a block diagram showing a fourth configuration example of the ideal synthesized frequency characteristic estimation unit 105. The ideal synthesized frequency characteristic estimation unit 105 shown in FIG. 20 includes a phase angle calculation unit 451, a gradient calculation unit 452, and a complex sine wave data calculation unit 453.

The phase angle calculation unit 451 is configured to, in the same manner as the phase angle calculation unit 351, calculate a phase angle of each element of the normalized cross power spectrum of the first image and the second image that are a pair of identical images output from the frequency characteristic synthesizing unit 104.

Further, regarding the phase angles of the respective elements obtained by the phase angle calculation unit 451, the gradient calculation unit 452 obtains, for each element and each dimension, the difference between the element and an element adjacent thereto, and outputs as phase angle gradient data. For example, it is assumed that as three-dimensional data corresponding to the elements of the normalized cross power spectrum, there are three three-dimensional data; an element 1 ($k_1$, $k_2$, $\angle R(k_1,k_2)$), an element 2 ($k_1+1$, $k_2$, $\angle R(k_1+1,k_2)$), and an element 3 ($k_1$, $k_2+1$, $\angle R(k_1,k_2+1)$). At this time, a phase angle difference $\angle R(k_1+1,k_2)-\angle R(k_1,k_2)$ between the element 1 and the element 2 is one phase angle gradient data of the dimension corresponding to the $k_1$ axis. A phase angle difference $\angle R(k_1,k_2+1)-\angle R(k_1,k_2)$ between the element 1 and the element 3 is one phase angle gradient data of the dimension corresponding to the $k_2$ axis. The gradient calculation unit 452 also calculates a representative value of the phase angle gradient for each dimension. The representative value may be an average value, a mode value, a median value, or the like.

Further, the complex sine wave data calculation unit 453 is configured to calculate two-dimensional complex sine wave data that gives a normalized cross power spectrum which is ideal when the first image and the second image are a pair of identical images, based on the representative value of the phase angle gradient of each dimension calculated by the gradient calculation unit 452 and Equation 9 shown in FIG. 10.

Figure 21:
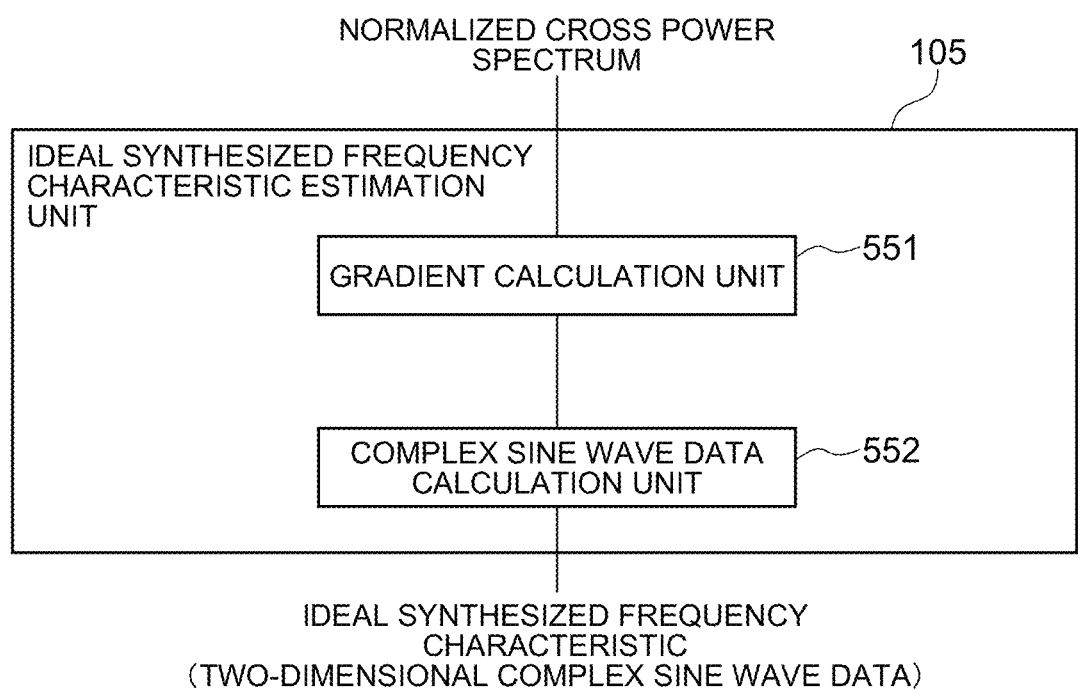
FIG. 21 is a block diagram showing a fifth example of the ideal synthesized frequency characteristic estimation unit in the image matching device according to the first example embodiment of the present invention.

FIG. 21 is a block diagram showing a fifth configuration example of the ideal synthesized frequency characteristic estimation unit 105. The ideal synthesized frequency characteristic estimation unit 105 shown in FIG. 21 includes a gradient calculation unit 551 and a complex sine wave data calculation unit 552.

The gradient calculation unit 551 is configured to calculate gradient data for each element of the normalized cross power spectrum of the first image and the second image that are a pair of identical images output from the frequency characteristic synthesizing unit 104. Mathematically, the gradient of each element of the normalized cross power spectrum is expressed by a two-dimensional vector in which the result of partially differentiating the normalized cross power spectrum by one of the discrete frequency indexes $k_1$ and $k_2$ and the result of partially differentiating the normalized cross power spectrum by the other discrete frequency index are arranged. Alternatively, the gradient calculation unit 551 calculates the gradient of each element of the normalized cross power spectrum as follows. First, the gradient calculation unit 551 calculates, for each element of the normalized cross power spectrum, the difference in normalized cross power spectrum value between the element and an element adjacent thereto in one of the discrete frequency index directions. The calculated difference value is held as a first partial differential value of the element. The gradient calculation unit 551 also calculates, for each element of the normalized cross power spectrum, the difference in the normalized cross power spectrum value between the element and an element adjacent thereto in the other discrete frequency index direction. The calculated difference value is held as a second partial differential value of the element. Then, the gradient calculation unit 551 sets, for each element of the normalized cross power spectrum, a two-dimensional vector in which the first partial differential value and the second partial differential value are arranged as the gradient data of the element.

Further, the complex sine wave data calculation unit 552 is configured to calculate two-dimensional complex sine wave data that gives a normalized cross power spectrum which is ideal when the first image and the second image are a pair of identical images, based on the gradient data calculated by the gradient calculation unit 551 and Equation 9 shown in FIG. 10. As shown in FIG. 22, in the case of a pair of identical images, the absolute value of the gradient data of each element is a constant value regardless of the discrete frequency index. That is to say, the absolute value of the first partial differential value of the gradient data is $2\pi\delta_1/N_1$, and the absolute value of the second partial differential value of the gradient data is $2\pi\delta_2/N_2$. The complex sine wave data calculation unit 552 calculates $\delta_1$ from the value of the first partial differential value and $2\pi\delta_1/N_1$ in a region where the absolute value of the gradient data is constant. Also, the complex sine wave data calculation unit 552 calculates $\delta_2$ from the value of the second partial differential value and $2\pi\delta_2/N_2$ in a region where the absolute value of the gradient data is constant. Then, the complex sine wave data calculation unit 552 substitutes the calculated $\delta_1$ and $\delta_2$ into Equation 9 to calculate two-dimensional complex sine wave data that gives a normalized cross power spectrum which is ideal when the first image and the second image are a pair of identical images.

Thus, the configuration examples of the ideal synthesized frequency characteristic estimation unit 105 that calculates a normalized cross power spectrum which is ideal when the first image and the second image are a pair of identical images have been described.

Subsequently, a configuration example of a normalized cross power spectrum that is ideal when the first image and the second image are a pair of different images and the ideal synthesized frequency characteristic estimation unit 105 that calculates the ideal cross power spectrum will be described.

In a case where the first image and the second image are a pair of different images, a correlation coefficient map obtained by synthesizing the frequency characteristics of the images to calculate a normalized cross power spectrum and performing inverse Fourier transformation thereon is expected to have no peak ideally. Meanwhile, when the pair of different images include a common pattern, the elements (components) of the frequency characteristics relating to the common pattern have correlation, so that a peak appears in the obtained correlation coefficient map. A normalized cross power spectrum which is ideal when the first image and the second image are a pair of different images is equivalent to a result of performing Fourier transformation on the correlation coefficient map having the peak. Therefore, the ideal synthesized frequency characteristic estimation unit 105 that calculates a normalized cross power spectrum which is ideal when the first image and the second image are a pair of different images can be configured in the same manner as the ideal synthesized frequency characteristic estimation unit that calculates a normalized cross power spectrum which is ideal when the first image and the second image are identical.

Subsequently, the difference calculation unit 106 will be descried in detail.

The difference calculation unit 106 can be realized by, for example, a subtractor that calculates the difference for each component (element) between the normalized cross power spectrum calculated by the frequency characteristic synthesizing unit 104 and the ideal normalized cross power spectrum calculated by the ideal synthesized frequency characteristic estimation unit 105. The difference for each component (element) takes a value range from −1 to +1, for example.

Subsequently, the weight calculation unit 107 will be described in detail.

The weight calculation unit 107 calculates a weight for each component (element) of the frequency characteristics based on the difference for each element between the normalized cross power spectrum and the ideal normalized cross power spectrum calculated by the difference calculation unit 106. Below, a case where the first image and the second image are a pair of identical images will be considered.

The weight calculation unit 107 calculates, for each element, the absolute value of the difference data calculated by the difference calculation unit 106. In the case of a pair of identical images, an element for which the absolute value of the difference thus obtained is closer to zero is an element of the normalized cross power spectrum which is less affected by change of a pattern generated between the first image and the second image. Therefore, the weight calculation unit 107 calculates a weight for each element of the normalized cross power spectrum by using Equation 11 shown in FIG. 23. That is to say, a value obtained by subtracting the absolute value of the difference $R_{diff}(k_1,k_2)$ from 1 is set as a weight $W(k_1,k_2)$. By using such a value as a weight for each element of the normalized cross power spectrum at the time of matching, it is possible to apply a large weight to an element that is valid for matching, and apply a small weight to an element that is not valid for matching, thereby calculating the score. The weight calculation unit 107 stores the weight for each element of the normalized cross power spectrum into the weight storage unit 108.

Figure 24:
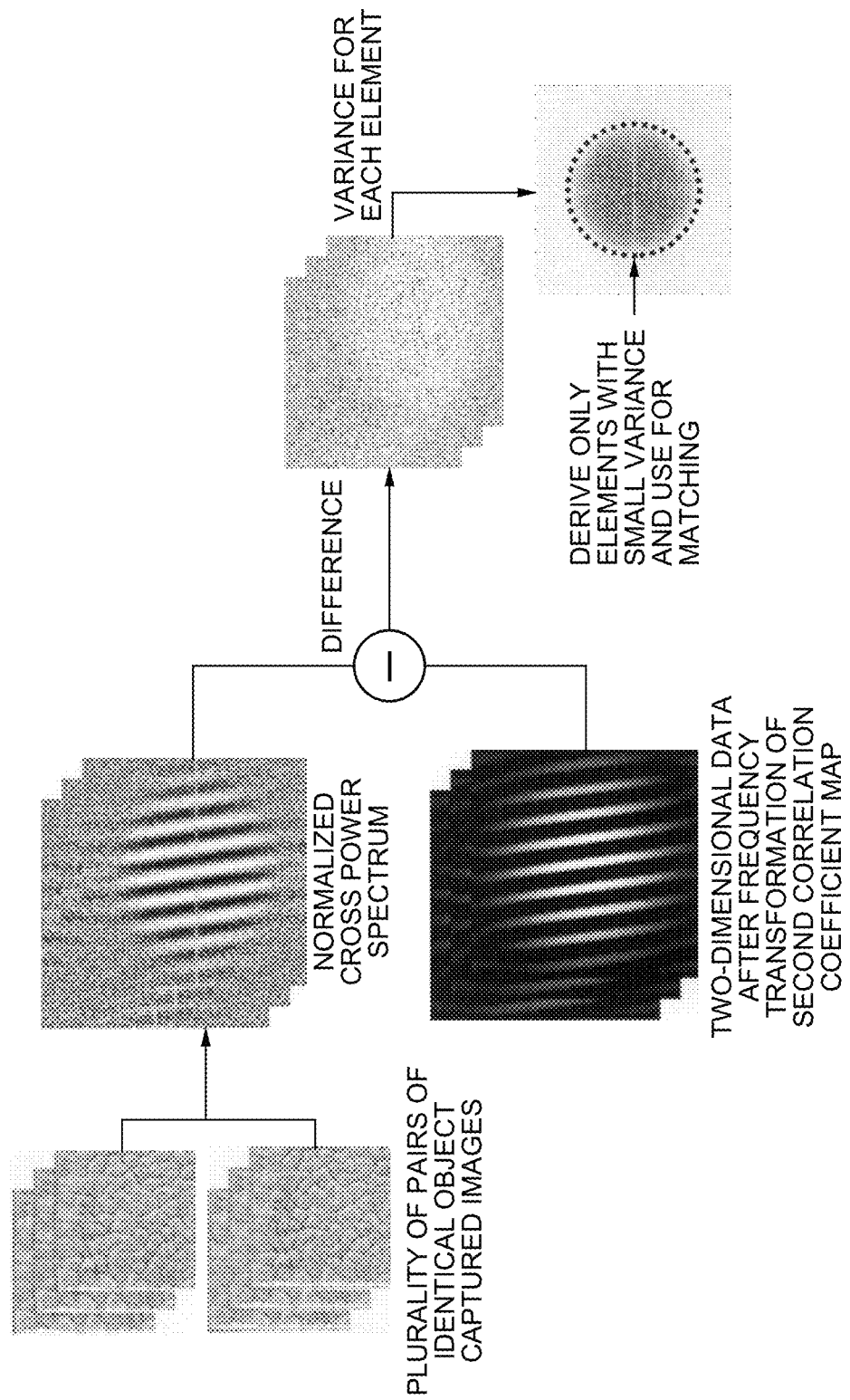
FIG. 24 is an operation explanation view of the weight calculation unit in the image matching device according to the first example embodiment of the present invention.

Further, as shown in FIG. 24, the weight calculation unit 107 preferably executes the same processing on a plurality of normalized cross power spectrums obtained from a plurality of pairs of identical images, thereby obtaining weights for the respective elements (components) of the frequency characteristics for the respective pairs of identical images. Next, by executing, for each of the elements, statistical processing of the weights for the respective elements obtained for the respective pairs of identical images, the weight calculation unit 107 may set the statistically processed weights as weights to be actually used. For example, a plurality of pairs of identical images are prepared by using, as the second image, an image obtained by generating loss or the like of an image edge pattern due to geometric variation, noise, illumination variation or imaging positioning error on the first image by simulation on a computer and giving a plurality of patterns to the first image. Alternatively, by capturing images of a plurality of objects to be identified and acquiring a plurality of first images and a plurality of second images, a combination of pairs of identical images may be given as teaching data. By thus preparing and giving a plurality of pairs of identical images, it is possible to calculate a large weight for an element of the frequency characteristics which is robust against an image capture condition and a minute difference between objects, and it is possible to expect increase of matching performance.

The above example shows a method for determining a weight using a pair of identical images. Next, a method for determining a weight using a pair of different images will be described. In the case of a pair of images in which the first image and the second image are different, a correlation coefficient map obtained by synthesizing the frequency characteristics of the images to calculate a normalized cross power spectrum and performing the inverse Fourier transformation thereon is expected to have no peak ideally. Meanwhile, when there is a common pattern in the pair of different images, the elements (components) of the frequency characteristics relating to the common pattern have correlation, so that a peak appears in the obtained correlation coefficient map. The peak due to the common pattern decreases the accuracy of matching. By eliminating an influence of the common pattern included by the pair of different images, it is possible to make the accuracy of matching higher.

In the case of a pair of images in which the first image and the second image are different, as described before, the ideal synthesized frequency characteristic estimation unit 105 calculates a normalized cross power spectrum obtained by applying the Fourier transformation to a correlation coefficient map having a peak caused by a common pattern included by the pair of different images, as an ideal normalized cross power spectrum. Moreover, as described before, the difference calculation unit 106 calculates a difference for each element between the normalized cross power spectrum obtained by synthesizing the frequency characteristic of the first image with the frequency characteristic of the second image that are a pair of different images and the ideal cross power spectrum. Therefore, in the case of a pair of different images, unlike in the case of a pair of identical images, an element for which the absolute value of the difference thus obtained is closer to zero is a common element (component) of the frequency characteristics between the first image and the second image, which is an element unnecessary for matching. Therefore, the weight calculation unit 107 calculates a weight for each element of the normalized cross power spectrum by using Equation 12 shown in FIG. 25. That is to say, the weight calculation unit 107 sets the absolute value of the difference $R_{diff}(k_1,k_2)$ as a weight $W(k_1,k_2)$. By using such a value as a weight for each element of the normalized cross power spectrum at the time of matching, it is possible to calculate the score by using only an element (component) of the frequency characteristics that is valid for matching. The weight calculation unit 107 stores the weight for each element of the normalized cross power spectrum into the weight storage unit 108.

Further, the weight calculation unit 107 preferably executes the same processing on a plurality of normalized cross power spectrums obtained from a plurality of pairs of different images, thereby obtaining weights for the respective elements (components) of the frequency characteristics for the respective pairs of identical images. Next, by executing, for each of the elements, statistical processing of the weights for the respective elements obtained for the respective pairs of different images, the weight calculation unit 107 may set the statistically processed weights as weights to be actually used. For example, a plurality of pairs of different images are prepared by using, as the second image, an image obtained by generating loss or the like of an image edge pattern due to geometric variation, noise, illumination variation or imaging positioning error on the first image by simulation on a computer and giving a plurality of patterns to the first image. Alternatively, by capturing images of a plurality of objects to be identified and acquiring a plurality of first images and a plurality of second images, a combination of pairs of different images may be given as teaching data. By thus preparing and giving a plurality of pairs of different images, it is possible to calculate a large weight for an element of the frequency characteristics which is robust against an image capture condition and a minute difference between objects, and it is possible to expect increase of matching performance.

The case where the first image and the second image are a pair of identical images and the case where the first image and the second image are a pair of different images have been separately described above. However, in practical use, it is desirable to prepare teaching data for both the cases where the first and second images are a pair of identical images and a pair of different images, and calculate weights. In this case, the weight calculation unit 107 first calculates, regarding a pair of images having been input, a weight for the case where the first image and the second image are a pair of identical images and a weight for the case where the first image and the second image are a pair of different images, respectively. Next, the weight calculation unit 107 stores a weight obtained by averaging the calculated weights for the respective cases as a weight used for matching into the weight storage unit 108. Thus, it is possible to calculate a weight that emphasizes a component (element) of the frequency characteristics that is valid only in the case of a pair of identical images, and increase the accuracy of matching. Alternatively, regarding the differences obtained from the pair of identical images and the pair of different images, by calculating the intra-class variance and inter-class variance in two classes of the pair of identical images and the pair of different images, a weight for each element (component) of the frequency characteristics may be determined based on the ratio of the intra-class variance and the inter-class variance. Alternatively, a weight for each element (component) of the frequency characteristics may be determined using another statistical method or machine learning. Moreover, although the weight calculation unit 107 obtains the absolute value of the difference in the synthesized frequency characteristic and calculates the weight as a "real number" in the above description, the weight calculator 107 may calculate a weight of a complex number. For example, in the case of a pair of identical images, the weight calculation unit 107 calculates a weight using Equation 13 shown in FIG. 26. Moreover, for example, in the case of a pair of different images, the weight calculation unit 107 calculates a weight using Equation 14 shown in FIG. 27.

Next, the matching determination unit 109 will be described in detail.

The matching determination unit 109 calculates a correlation coefficient map by weighting each element of the normalized cross power spectrum calculated by the frequency characteristic synthesizing unit 104 with the weight for the element stored in the weight storage unit 108, and performing the inverse Fourier transformation. As described above, in the case of a pair of identical images, the normalized cross power spectrum is expressed as a complex sine wave having a single period. Therefore, by performing the inverse Fourier transformation, only a specific spectrum appears conspicuously, and a sharp peak appears in the correlation coefficient map. On the other hand, in the case of not a pair of identical images, the normalized cross power spectrum is not a complex sine wave having a single period. Therefore, a sharp peak does not appear in the correlation coefficient map. In other words, it is possible to determine whether the images are a pair of identical images or different images based on the maximum value of the peak in the correlation coefficient map. In particular, only in the case of a pair of identical image, the correlation coefficient map is calculated so that only elements appearing as a complex sine wave having a single period in the normalized cross power spectrum are emphasized by the weights. Therefore, a peak of the correlation coefficient map becomes steeper in the case of a pair of identical images. In the case of a pair of different images, it is possible to suppress a peak caused by an influence of a common pattern included in the pair of images and consequently it is possible to increase the accuracy of matching.

Further, although the matching determination unit 109 performs matching by obtaining the correlation coefficient map from the normalized cross power spectrum and detecting the peak thereof in the above example, the present invention is not limited thereto. For example, the matching determination unit 109 may apply the method described in Non-Patent Document 1 to a weighted normalized cross power spectrum. That is to say, the matching determination unit 109 may determine a distribution shape in the frequency domain of the weighted normalized cross power spectrum and thereby determine the identity of images to be matched. Below, a configuration example of the matching determination unit 109 that determines a distribution shape in the frequency domain of the weighted normalized cross power spectrum will be described.

For example, the matching determination unit 109 calculates a score representing a degree that the weighted normalized cross power spectrum has a wave having a single period, and determines the identity of images to be matched based on the score. Alternatively, the matching determination unit 109 may calculate a score representing a degree that the weighted normalized cross power spectrum is a complex sine wave having a single period. Alternatively, the matching determination unit 109 may calculate the variance of absolute values of gradients of the respective elements of the weighted normalized cross power spectrum, as the above-mentioned score. Alternatively, the matching determination unit 109 may calculate the variance of absolute values of second-order partial differential values of the respective elements of the weighted normalized cross power spectrum, as the abovementioned score. Alternatively, the matching determination unit 109 may obtain the phase angles of the respective elements of the weighted normalized cross power spectrum and calculate a degree to which the phase angles are linear with respect to the frequency as the score. Alternatively, the matching determination unit 109 may obtain an approximate plane that fits the phase angles of the respective elements of the weighted normalized cross power spectrum and calculate the least square error of the phase angles of the respective elements with respect to the approximate plane as the score. Alternatively, the matching determination unit 109 may obtain a gradient that is a difference of the phase angles between the elements of the weighted normalized cross power spectrum and calculate the variance of the gradients as the score.

Thus, with the image matching device 100 according to this example embodiment, it is possible to automatically determine a frequency characteristic which is useful for matching and increase the accuracy of matching. This is because the image matching device 100 according to this example embodiment, using the frequency characteristics of the first and second images that are a pair of identical or different images collected beforehand, determines whether or not each component (element) of the frequency characteristics is useful for matching, obtains a weight representing the degree of usefulness, and performs matching based on the weight.

Further, the image matching device 100 according to this example embodiment, based on the difference between a synthesized frequency characteristic obtained by synthesizing the frequency characteristic of the first image and the frequency characteristic of the second image, an ideal synthesized frequency characteristic which is an ideal one obtained by synthesizing the frequency characteristic of the first image and the frequency characteristic of the second image, determines a component (element) of the frequency characteristics that is useful for matching and a component (element) of the frequency characteristics that is not useful for matching. Therefore, even if a common pattern in a plurality of images is a pattern that cannot be imaged alone, such as a common characteristic or texture of a plurality of objects to be imaged, it is possible to increase the accuracy of matching.

Further, the image matching device 100 according to this example embodiment has the following advantages as compared with the invention described in Patent Document 3.

It is assumed that a pattern A and a pattern N exist in a registered image and the pattern A and the pattern N exist in a compared image. That is to say, a case where the registered image and the compared image are identical images. Herein, the pattern A is a pattern unique to the registered image, and the pattern N is a pattern common to a plurality of images. When a cross power spectrum of the registered image and the compared image is obtained, a cross power spectrum component AN of the pattern A and the pattern N, a cross power spectrum component NA of the pattern N and the pattern A, and a cross power spectrum component NN of the pattern N and the pattern N are obtained in addition to a cross power spectrum component AA of the pattern A and the pattern A. Of these cross power spectrum components, the cross power spectrum component AA is an important component for determining the similarity between the registered image and the compared image, and the other cross power spectrum components AN, NA and NN are all noise.

According to the invention described in Patent Document 3, when the pattern A and the pattern N exist in the registered image, the frequency component of the pattern A and the frequency component of the pattern N are estimated and, based on each of the estimated frequency components, controls a weight relating to frequency at the time of obtaining the correlation between the registered image and the collation image. That is to say, a relatively large weight is set for the frequency component of the pattern A, and a relatively small weight is set for the pattern N. As a result, of the cross power spectrum components when the registered image and the compared image are identical images, the weight of the cross power spectrum component AA can be made relatively large, and the weight of the cross power spectrum component NN can be made relatively small. However, with respect to the cross power spectrum components AN and NA included in the cross power spectrum of the registered image and the compared image, the weight for the pattern A and the weight for the pattern N cancel each other out, so that the weights are not relatively small. In Patent Document 3, the cross power spectrum components AN and NA are ignored because they are considered to be usually small values (for example, see paragraph 0053 of Patent Document 3). However, since the cross power spectrum components AN and NA are not so small as to be negligible in some cases, the accuracy of matching is lowered in such a case.

On the other hand, according to this example embodiment, an ideal cross power spectrum obtained from a pair of identical images is obtained when the pattern N does not exist. Therefore, with the ideal cross power spectrum, the cross power spectrum component AA between the pattern A and the pattern A is obtained, but the cross power spectrum components AN, NA and NN are not obtained. Therefore, according to the weighting based on the difference between the cross power spectrum and the ideal cross power spectrum of a pair of identical images, it is possible to perform determination of weight such that a relatively large weight is given to the frequency component of the cross power spectrum component AA commonly existing in both, and relatively small weights are given to the frequency components of the cross power spectrum components AN, NA, and NN that do not exist in the ideal cross power spectrum. Then, by giving such weights, it is possible to eliminate influences of the cross power spectrums AN, NA and NN that are noise when performing matching of a pair of identical images, and it is possible to increase the accuracy of matching.

Although an example of performing individual identification of an industrial product or a commercial product has been described in this example embodiment, it may be used for other application of image matching. For example, an image matching device of the same configuration as in this example embodiment may be applied to an image pattern obtained by capturing an image of the fingerprint or iris of a person and may be used for personal authentication.

Second Example Embodiment

Figure 28:
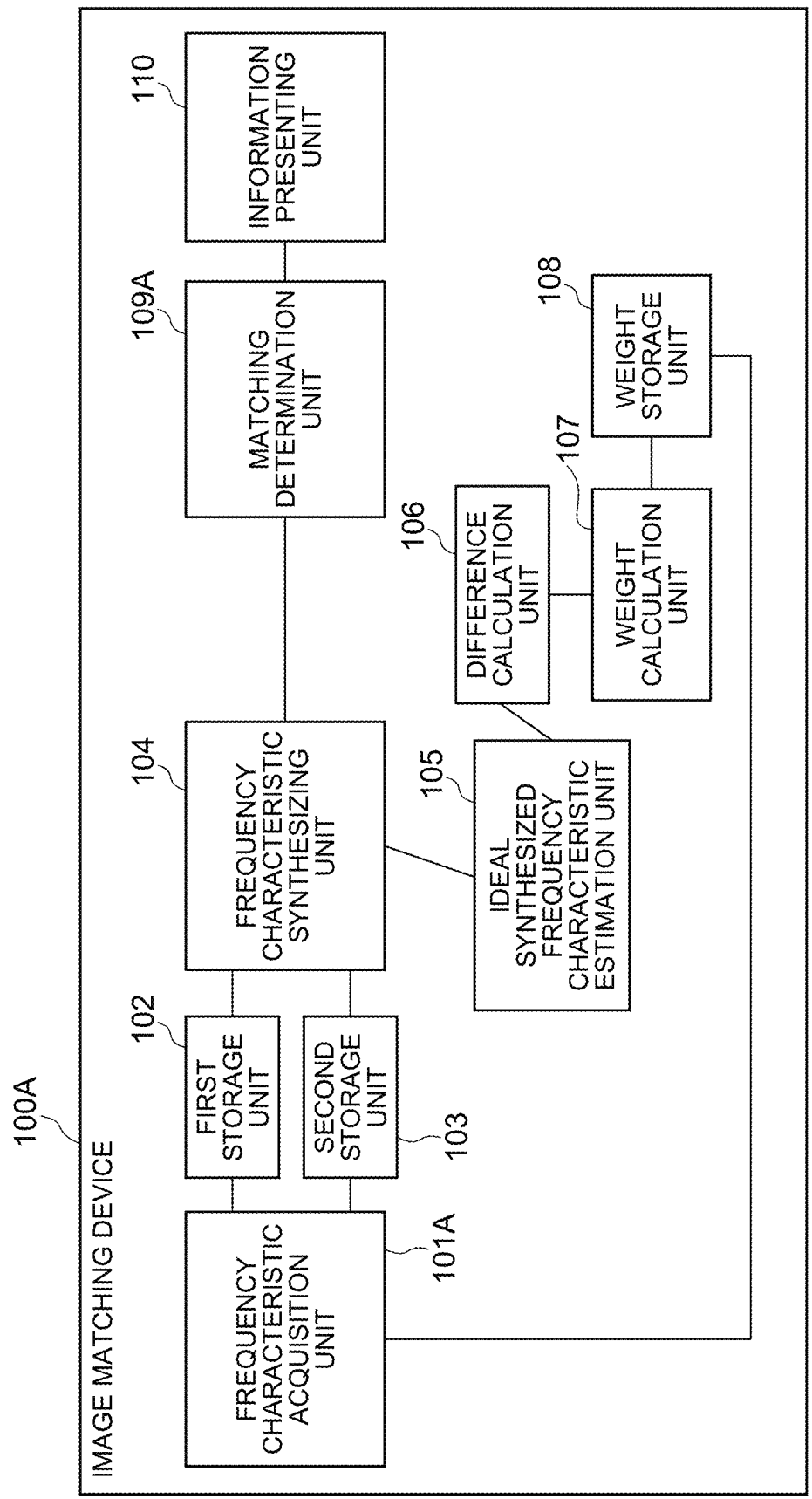
FIG. 28 is a block diagram of an image matching device according to a second example embodiment of the present invention.

FIG. 28 is a block diagram of an image matching device 100A according to a second example embodiment of the present invention. The image matching device 100A according to this example embodiment differs from the image matching device 100 shown in FIG. 1 in that the frequency characteristic acquisition unit 101 and the matching determination unit 109 of the image matching device 100 are replaced with a frequency characteristic acquisition unit 101A and a matching determination unit 109A, and is otherwise the same as the image matching device 100.

The frequency characteristic acquisition unit 101A differs from the frequency characteristic acquisition unit 101 in using the weights stored in the weight storage unit 108 to acquire the frequency characteristics of the registered image and the compared image in the online processing (image matching using the set weights), and is otherwise the same as the frequency characteristic acquisition unit 101. For example, the frequency characteristic acquisition unit 101A is configured to create mask data in which an element of the frequency characteristics that is valid for matching is 1 and an unnecessary element is 0, based on the weights for the respective elements (components) of the frequency characteristic elements stored in the weight storage unit 108. The frequency characteristic acquisition unit 101A is also configured to, in accordance with the mask data, extract only the element of the frequency characteristic that is valid for matching from the registered image, extract only the element of the frequency characteristic that is valid for matching from the compared image, and store the elements into the first storage unit 102 and the second storage unit 103, respectively.

The matching determination unit 109A is configured to determine the identity of the images without especially weighting the normalized cross power spectrum calculated by the frequency characteristic synthesizing unit 104.

Thus, with the image matching device 100A according to this example embodiment, it is possible to automatically determine a frequency characteristic useful for matching, leave only an element useful for matching, and reduce the amount of data used for matching.

Third Example Embodiment

Figure 29:
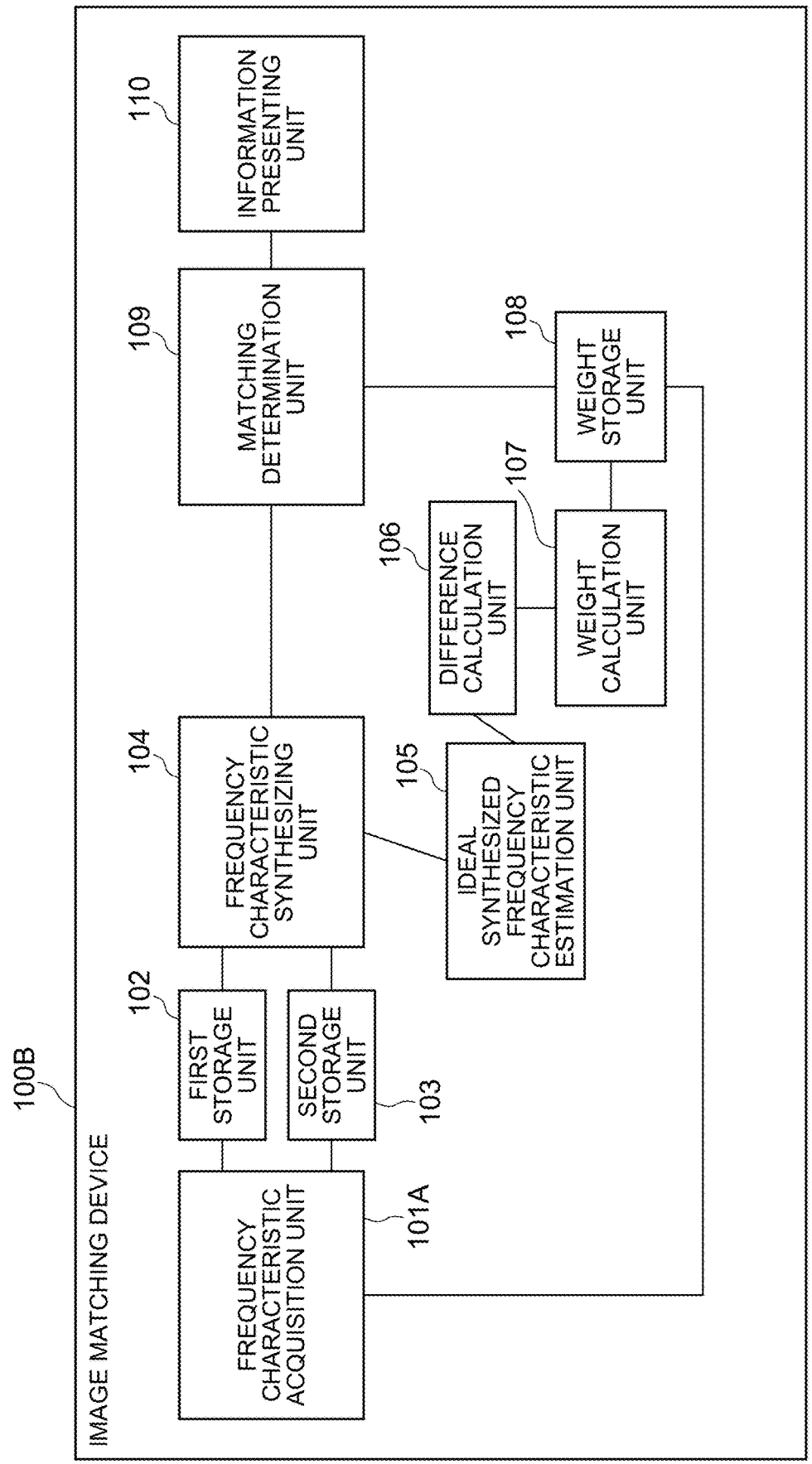
FIG. 29 is a block diagram of an image matching device according to a third example embodiment of the present invention.

FIG. 29 is a block diagram of an image matching device 100B according to a third example embodiment of the present invention. The image matching device 100B according to this example embodiment differs from the image matching device 100 shown in FIG. 1 in that the frequency characteristic acquisition unit 101 of the image matching device 100 is replaced with the frequency characteristic acquisition unit 101A as in the second example embodiment shown in FIG. 28, and is otherwise the same as the image matching device 100.

Thus, with the image matching device 100B according to this example embodiment, it is possible to automatically determine a frequency characteristic useful for matching, leave only an element useful for matching, and reduce the amount of data used for matching. Moreover, when the score is calculated by the matching determination unit 109, the score is calculated by emphasizing a more important characteristic element (component) based on a weighted normalized cross power spectrum as in the first example embodiment.

Fourth Example Embodiment

The image matching device 100C according to this example embodiment differs in the frequency characteristic acquisition unit 101 from the image matching devices according to the first to third example embodiments, and is otherwise the same as the image matching devices according to the first to third example embodiments.

Figure 30:
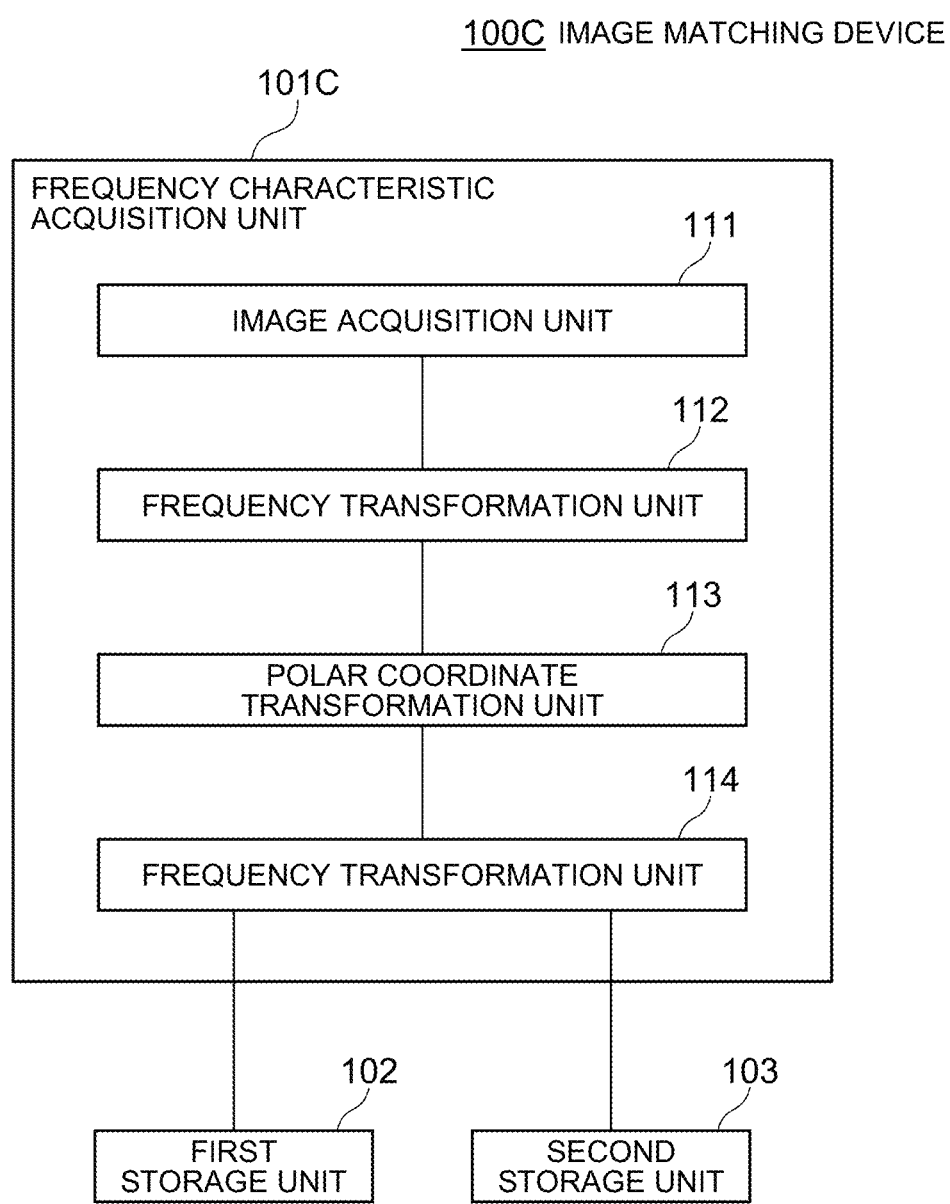
FIG. 30 is a block diagram of a frequency characteristic acquisition unit used in an image matching device according to a fourth example embodiment of the present invention.

FIG. 30 is a block diagram of a frequency characteristic acquisition unit 101C in the image matching device 100C according to this example embodiment. The frequency characteristic acquisition unit 10C of this example includes the image acquisition unit 111, the frequency transformation unit 112, a polar coordinate transformation unit 113, and a frequency transformation unit 114. The image acquisition unit 111 is configured to acquire the first image and the second image in the same manner as the image acquisition unit 111 shown in FIG. 7. The frequency transformation unit 112 is configured to receive the first image and the second image from the image acquisition unit 111, apply the discrete Fourier transformation to the respective images, and calculate two-dimensional amplitude spectrums from the results of the discrete Fourier transformation. The two-dimensional amplitude spectrum is invariant to the translation of the original image.

The polar coordinate transformation unit 113 is configured to receive the two-dimensional amplitude spectrum of the first image and the two-dimensional amplitude spectrum of the second image from the frequency transformation unit 112, apply the polar coordinate transformation or the logarithmic polar coordinate transformation to the two-dimensional amplitude spectrums, and calculate polar coordinate images. The polar coordinate image is called a Fourier-Mellin characteristic image. Changes in magnification and rotation of the original image are transformed into changes in translation in the Fourier-Mellin feature image.

The frequency transformation unit 114 is configured to receive the Fourier-Mellin characteristic image of the first image and the Fourier-Mellin characteristic image of the second image from the polar coordinate transformation unit 113 and apply the discrete Fourier transformation to the Fourier-Mellin characteristic images to calculate phase images. The phase image is called a Fourier-Mellin frequency spectrum image. The Fourier-Mellin frequency spectrum image is invariant to magnification, rotation and translation of the original image. The frequency transformation unit 114 stores the Fourier-Mellin frequency spectrum image of the first image in the first storage unit 102, and stores the Fourier-Mellin frequency spectrum image of the second image in the second storage unit 103.

With the image matching device 100C according to this example embodiment, it is possible to perform matching that is robust to the magnification, rotation and translation of the first and second images. The polar coordinate transformation unit 113 in FIG. 30 may be omitted in an environment in which there is no positional shift of magnification and rotation between the first image and the second image. In the image matching device with the polar coordinate transformation unit 113 being omitted, the frequency transformation unit 114 is configured to receive the two-dimensional amplitude spectrum of the first image and the two-dimensional amplitude spectrum of the second image from the frequency transformation unit 112, apply the discrete Fourier transformation to the two-dimensional amplitude spectrums, and store phase images obtained as a result of the discrete Fourier transformation into the first storage unit 102 and the second storage unit 103.

Fifth Example Embodiment

Figure 31:
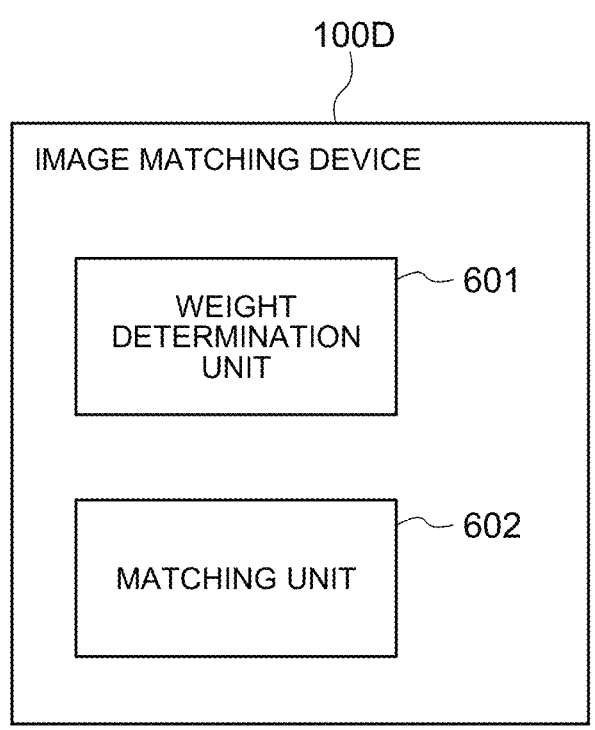
FIG. 31 is a block diagram of an image matching device according to a fifth example embodiment of the present invention.

FIG. 31 is a block diagram of an image matching device 100D according to a fifth example embodiment of the present invention. Referring to FIG. 31, the image matching device 100D includes a weight determination unit 601 and a matching unit 602.

The weight determination unit 601 is configured to, based on a difference between a synthesized frequency characteristic obtained by synthesizing the frequency characteristic of a first image with the frequency characteristic of a second image and an ideal synthesized frequency characteristic that is an ideal one obtained by synthesizing the frequency characteristic of the first image with the frequency characteristic of the second image, determine a weight relating to frequency at the time of performing matching of the first image and a third image. The weight determination unit 601 can include, for example, the frequency characteristic acquisition unit 101, the first storage unit 102, the second storage unit 103, the frequency characteristic synthesizing unit 104, the ideal synthesized frequency characteristic estimation unit 105, the difference calculation unit 106, the weight calculation unit 107 and the weight storage unit 108 shown in FIG. 3, but is not limited thereto.

The matching unit 602 is configured to perform matching of the first image and the third image based on the weight determined by the weight determination unit 601. The matching unit 602 can include, for example, the frequency characteristic acquisition unit 101, the first storage unit 102, the second storage unit 103, the frequency characteristic synthesizing unit 104, the weight storage unit 108 and the matching determination unit 109 shown in FIG. 5, but is not limited thereto.

The image matching device 100D thus configured functions in the following manner. First, the weight determination unit 601 determines, based on a difference between a synthesized frequency characteristic obtained by synthesizing the frequency characteristic of the first image with the frequency characteristic of the second image and an ideal synthesized frequency characteristic that is an ideal one obtained by synthesizing the frequency characteristic of the first image and the frequency characteristic of the second image, a weight relating to frequency at the time of performing matching of the first image and the third image. Next, the matching unit 602 performs matching of the first image and the third image based on the weight determined by the weight determination unit 601.

The image matching device 100D according to this example embodiment is configured and operated in the abovementioned manner, and thus, the image matching device 100D can, when a pattern commonly included in a plurality of images that adversely affects matching is a pattern that cannot be imaged alone, determine a weight relating to frequency at the time of performing matching of a plurality of images and consequently increase the accuracy of matching. This is because, based on a difference between a synthesized frequency characteristic obtained by synthesizing the frequency characteristic of the first image with the frequency characteristic of the second image and an ideal synthesized frequency characteristic that is an ideal one obtained by synthesizing the frequency characteristic of the first image with the frequency characteristic of the second image, a weight relating to frequency at the time of performing matching of the first image and the third image is determined, and an image in which the pattern commonly included in the plurality of images is captured alone is not required.

The present invention has been described above with reference to the example embodiments, but is not limited to the example embodiments. The configurations and details of the present invention can be changed in various manners that can be understood by one skilled in the art within the scope of the present invention.

The present invention can be used in the field of performing matching of two images and in particular, the present invention can be used in the field of performing individual identification and management of each product by acquiring the difference between naturally occurring minute patterns caused in the same production process such as minute irregularities and patterns on the product surface, random patterns on the material surface and so on, as an image with an imaging device such as a camera, and recognizing the minute pattern.

Supplementary Notes

The whole or part of the example embodiments disclosed above can be described as, but not limited to, the following supplementary notes.

(Supplementary Note 1)

An image matching device comprising:

a weight determination unit configured to determine a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and a matching unit configured to perform matching of the first image and the third image based on the determined weight.

(Supplementary Note 2)

The image matching device according to Supplementary Note 1, wherein the weight determination unit is configured to estimate a complex sine wave having a single period as the ideal synthesized frequency characteristic from the synthesized frequency characteristic.

(Supplementary Note 3)

The image matching device according to Supplementary Note 2, wherein the weight determination unit is configured to calculate a first correlation coefficient map by applying inverse Fourier transformation to the synthesized frequency characteristic, calculate a second correlation coefficient map by processing the first correlation coefficient map, and calculate the ideal synthesized frequency characteristic by applying Fourier transformation to the second correlation coefficient map.

(Supplementary Note 4)

The image matching device according to Supplementary Note 2, wherein the weight determination unit is configured to calculate a correlation coefficient map by applying inverse Fourier transformation to the synthesized frequency characteristic, calculate a position on real space in which a correlation coefficient is maximum from the correlation coefficient map, and calculate the ideal synthesized frequency characteristic based on the position and a previously determined equation that gives the ideal synthesized frequency characteristic.

(Supplementary Note 5)

The image matching device according to Supplementary Note 2, wherein the weight determination unit is configured to calculate an approximate plane that fits a phase angle of each element of the synthesized frequency characteristic, and calculate the ideal synthesized frequency characteristic based on a slope of the approximate plane and an equation that gives the ideal synthesized frequency characteristic.

(Supplementary Note 6)

The image matching device according to Supplementary Note 2, wherein the weight determination unit is configured to calculate an approximate phase angle gradient that represents a phase angle gradient of each element of the synthesized frequency characteristic, and calculate the ideal synthesized frequency characteristic based on the approximate phase angle gradient and an equation that gives the ideal synthesized frequency characteristic.

(Supplementary Note 7)

The image matching device according to Supplementary Note 2, wherein the weight determination unit is configured to calculate gradient data of each element of the synthesized frequency characteristic, and calculate the ideal synthesized frequency characteristic based on the gradient data and an equation that gives the ideal synthesized frequency characteristic.

(Supplementary Note 8)

The image matching device according to any of Supplementary Notes 1 to 7, wherein the weight determination unit is configured to determine the weight based on a difference for each element between the synthesized frequency characteristic and the ideal synthesized frequency characteristic.

(Supplementary Note 9)

The image matching device according to any of Supplementary Notes 1 to 8, wherein the matching unit is configured to calculate a synthesized frequency characteristic obtained by synthesizing the frequency characteristic of the first image with a frequency characteristic of the third image based on the weight.

(Supplementary Note 10)

The image matching device according to Supplementary Note 9, wherein the matching unit is configured to detect a peak of a correlation coefficient map obtained by applying inverse Fourier transformation to the synthesized frequency characteristic calculated based on the weight.

(Supplementary Note 11) The image matching device according to Supplementary Note 9, wherein the matching unit is configured to determine a distribution shape in frequency domain of the synthesized frequency characteristic calculated based on the weight.

(Supplementary Note 12)

The image matching device according to any of Supplementary Notes 1 to 11, wherein the matching unit is configured to acquire the frequency characteristic of the first image and a frequency characteristic of the third image based on the weight.

(Supplementary Note 13)

The image matching device according to any of Supplementary Notes 1 to 12, wherein the synthesized frequency characteristic is a normalized cross power spectrum.

(Supplementary Note 14)

An image matching method comprising:

determining a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and performing matching of the first image and the third image based on the determined weight.

(Supplementary Note 15)

The image matching method according to Supplementary Note 14, wherein in the determining the weight, a complex sine wave having a single period as the ideal synthesized frequency characteristic is estimated from the synthesized frequency characteristic.

(Supplementary Note 16)

The image matching method according to Supplementary Note 15, wherein in the determining the weight, a first correlation coefficient map is calculated by applying inverse Fourier transformation to the synthesized frequency characteristic, a second correlation coefficient map is calculated by processing the first correlation coefficient map, and the ideal synthesized frequency characteristic is calculated by applying Fourier transformation to the second correlation coefficient map.

(Supplementary Note 17)

The image matching method according to Supplementary Note 15, wherein in the determining the weight, a correlation coefficient map is calculated by applying inverse Fourier transformation to the synthesized frequency characteristic, a position on real space in which a correlation coefficient is maximum is calculated from the correlation coefficient map, and the ideal synthesized frequency characteristic is calculated based on the position and a previously determined equation that gives the ideal synthesized frequency characteristic.

(Supplementary Note 18)

The image matching method according to Supplementary Note 15, wherein in the determining the weight, an approximate plane that fits a phase angle of each element of the synthesized frequency characteristic is calculated, and the ideal synthesized frequency characteristic is calculated based on a slope of the approximate plane and an equation that gives the ideal synthesized frequency characteristic.

(Supplementary Note 19)

The image matching method according to Supplementary Note 15, wherein in the determining the weight, an approximate phase angle gradient that represents a phase angle gradient of each element of the synthesized frequency characteristic is calculated, and the ideal synthesized frequency characteristic is calculated based on the approximate phase angle gradient and an equation that gives the ideal synthesized frequency characteristic.

(Supplementary Note 20)

The image matching method according to Supplementary Note 15, wherein in the determining the weight, gradient data of each element of the synthesized frequency characteristic is calculated, and the ideal synthesized frequency characteristic is calculated based on the gradient data and an equation that gives the ideal synthesized frequency characteristic.

(Supplementary Note 21)

The image matching method according to any of Supplementary Notes 14 to 20, wherein in the determining the weight, the weight is determined based on a difference for each element between the synthesized frequency characteristic and the ideal synthesized frequency characteristic.

(Supplementary Note 22)

The image matching method according to any of Supplementary Notes 14 to 21, wherein in the matching, a synthesized frequency characteristic obtained by synthesizing the frequency characteristic of the first image with a frequency characteristic of the third image is calculated based on the weight.

(Supplementary Note 23)

The image matching device according to Supplementary Note 22, wherein in the matching, a peak of a correlation coefficient map obtained by applying inverse Fourier transformation to the synthesized frequency characteristic calculated based on the weight is detected.

(Supplementary Note 24)

The image matching method according to Supplementary Note 22, wherein in the matching, a distribution shape in frequency domain of the synthesized frequency characteristic calculated based on the weight is determined.

(Supplementary Note 25)

The image matching method according to any of Supplementary Notes 14 to 24, wherein in the matching, the frequency characteristic of the first image and a frequency characteristic of the third image are acquired based on the weight.

(Supplementary Note 26)

The image matching method according to any of Supplementary Notes 14 to 25, wherein the synthesized frequency characteristic is a normalized cross power spectrum.

(Supplementary Note 27)

A non-transitory computer-readable recording medium having a program recorded thereon, the program comprising instructions for causing a computer to function as:

a weight determination unit configured to determine a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and a matching unit configured to perform matching of the first image and the third image based on the determined weight.

DESCRIPTION OF NUMERALS 100 image matching device
100A image matching device
100B image matching device
100C image matching device
100D image matching device
101 frequency characteristic acquisition unit
101A frequency characteristic acquisition unit
102 first storage unit
103 second storage unit
104 frequency characteristic synthesizing unit
105 ideal synthesized frequency characteristic estimation unit
106 difference calculation unit
107 weight calculation unit
108 weight storage unit
109 matching determination unit
109A matching determination unit
110 information presenting unit
111 image acquisition unit
112 frequency transformation unit
113 polar coordinate transformation unit
114 frequency transformation unit
151 first correlation coefficient map calculation unit
152 correlation peak detection unit
153 second correlation coefficient map calculation unit
154 frequency transformation unit
200 information processing device
201 imaging unit
202 operation input unit
203 screen display unit
204 communication interface unit
205 storage unit
206 arithmetic processing unit
251 correlation coefficient map calculation unit
252 correlation peak detection unit
253 complex sine wave data calculation unit
351 phase angle calculation unit
352 approximate plane calculation unit
353 complex sine wave data calculation unit
451 phase angle calculation unit
452 gradient calculation unit
453 complex sine wave data calculation unit
551 gradient calculation unit
552 complex sine wave data calculation unit
601 weight determination unit
602 matching unit

What is claimed is:

1. An image matching device comprising:

a weight determination unit configured to determine a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and a matching unit configured to perform matching of the first image and the third image based on the determined weight.

2. The image matching device according to claim 1, wherein the weight determination unit is configured to estimate a complex sine wave having a single period as the ideal synthesized frequency characteristic from the synthesized frequency characteristic.

3. The image matching device according to claim 2, wherein the weight determination unit is configured to calculate a first correlation coefficient map by applying inverse Fourier transformation to the synthesized frequency characteristic, calculate a second correlation coefficient map by processing the first correlation coefficient map, and calculate the ideal synthesized frequency characteristic by applying Fourier transformation to the second correlation coefficient map.

4. The image matching device according to claim 2, wherein the weight determination unit is configured to calculate a correlation coefficient map by applying inverse Fourier transformation to the synthesized frequency characteristic, calculate a position on real space in which a correlation coefficient is maximum from the correlation coefficient map, and calculate the ideal synthesized frequency characteristic based on the position and a previously determined equation that gives the ideal synthesized frequency characteristic.

5. The image matching device according to claim 2, wherein the weight determination unit is configured to calculate an approximate plane that fits a phase angle of each element of the synthesized frequency characteristic, and calculate the ideal synthesized frequency characteristic based on a slope of the approximate plane and an equation that gives the ideal synthesized frequency characteristic.

6. The image matching device according to claim 2, wherein the weight determination unit is configured to calculate an approximate phase angle gradient that represents a phase angle gradient of each element of the synthesized frequency characteristic, and calculate the ideal synthesized frequency characteristic based on the approximate phase angle gradient and an equation that gives the ideal synthesized frequency characteristic.

7. The image matching device according to claim 2, wherein the weight determination unit is configured to calculate gradient data of each element of the synthesized frequency characteristic, and calculate the ideal synthesized frequency characteristic based on the gradient data and an equation that gives the ideal synthesized frequency characteristic.

8. The image matching device according to claim 1, wherein the weight determination unit is configured to determine the weight based on a difference for each element between the synthesized frequency characteristic and the ideal synthesized frequency characteristic.

9. The image matching device according to claim 1, wherein the matching unit is configured to calculate a synthesized frequency characteristic obtained by synthesizing the frequency characteristic of the first image with a frequency characteristic of the third image based on the weight.

10. The image matching device according to claim 9, wherein the matching unit is configured to detect a peak of a correlation coefficient map obtained by applying inverse Fourier transformation to the synthesized frequency characteristic calculated based on the weight.

11. The image matching device according to claim 9, wherein the matching unit is configured to determine a distribution shape in frequency domain of the synthesized frequency characteristic calculated based on the weight.

12. The image matching device according to claim 1, wherein the matching unit is configured to acquire the frequency characteristic of the first image and a frequency characteristic of the third image based on the weight.

13. The image matching device according to claim 1, wherein the synthesized frequency characteristic is a normalized cross power spectrum.

14. An image matching method comprising:
   determining a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and
   performing matching of the first image and the third image based on the determined weight.

15. A non-transitory computer-readable recording medium having a program recorded thereon, the program comprising instructions for causing a computer to function as:
   a weight determination unit configured to determine a weight relating to frequency based on a difference between a synthesized frequency characteristic and an ideal synthesized frequency characteristic, the synthesized frequency characteristic being obtained by synthesizing a frequency characteristic of a first image with a frequency characteristic of a second image, the ideal synthesized frequency characteristic being an ideal one obtained by synthesizing the frequency characteristic of the first image with the frequency characteristic of the second image, the weight relating to frequency being used in performing matching of the first image and a third image; and
   a matching unit configured to perform matching of the first image and the third image based on the determined weight.

* * * * *